(12) United States Patent
Choi

(10) Patent No.: US 9,796,379 B2
(45) Date of Patent: Oct. 24, 2017

(54) DRIVING ASSISTANCE APPARATUS, AND CONTROL METHOD THEREOF

(71) Applicant: HYUNDAI MOTOR COMPANY, Seoul (KR)

(72) Inventor: Kwanghun Choi, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 295 days.

(21) Appl. No.: 14/562,335

(22) Filed: Dec. 5, 2014

(65) Prior Publication Data

US 2016/0076894 A1 Mar. 17, 2016

(30) Foreign Application Priority Data

Sep. 16, 2014 (KR) .................. 10-2014-0122560

(51) Int. Cl.
*G01C 21/34* (2006.01)
*B60W 30/00* (2006.01)
*B60W 50/00* (2006.01)

(52) U.S. Cl.
CPC ........ *B60W 30/00* (2013.01); *B60W 50/0097* (2013.01); *B60W 2550/22* (2013.01); *B60W 2550/402* (2013.01)

(58) Field of Classification Search
CPC . G01C 21/34; B60W 30/009; B60W 2550/22; B60W 50/0097; B60W 2550/402
See application file for complete search history.

(56) References Cited

U.S. PATENT DOCUMENTS

| 2003/0204306 A1* | 10/2003 | Yamamoto | G08G 1/096716 701/516 |
| 2008/0140313 A1* | 6/2008 | Jung | G01C 21/3626 701/533 |
| 2008/0183379 A1* | 7/2008 | Ito | G09B 29/106 701/467 |
| 2010/0042651 A1* | 2/2010 | Nakamura | G01C 21/32 701/450 |
| 2010/0217455 A1* | 8/2010 | Stahlin | G08G 1/0969 701/1 |
| 2011/0054716 A1* | 3/2011 | Stahlin | G01C 21/28 701/1 |

(Continued)

FOREIGN PATENT DOCUMENTS

| JP | EP 0875878 A2 * | 11/1998 | ......... G01C 21/3632 |
| JP | EP 1179914 A2 * | 2/2002 | ............. H04L 12/24 |

(Continued)

OTHER PUBLICATIONS

Korean Office Action dated Feb. 12, 2016 issued in Korean Patent Application No. 10-2014-0122560.

(Continued)

*Primary Examiner* — Tuan C. To
(74) *Attorney, Agent, or Firm* — McDermott Will & Emery LLP

(57) ABSTRACT

A driving assistance apparatus includes a storage configured to store map information; and a communication device configured to transmit location information to a second driving assistance apparatus at predetermined time periods, wherein the communication device transmits the map information to the second driving assistance apparatus if a target of the map information changes.

21 Claims, 17 Drawing Sheets

(56) References Cited

U.S. PATENT DOCUMENTS

| | | | |
|---|---|---|---|
| 2011/0090071 A1* | 4/2011 | Platonov | G06K 9/00818 340/425.5 |
| 2011/0179080 A1* | 7/2011 | Miyazaki | G06F 17/30241 707/772 |
| 2011/0205153 A1* | 8/2011 | Ueda | G01C 21/362 345/156 |
| 2011/0257883 A1* | 10/2011 | Kuznetsov | G01C 21/3691 701/533 |
| 2012/0150432 A1* | 6/2012 | Kono | G01C 21/3655 701/428 |
| 2013/0080054 A1* | 3/2013 | Kutomi | G08G 1/0969 701/533 |
| 2013/0110371 A1* | 5/2013 | Ogawa | G08G 1/095 701/70 |
| 2013/0345977 A1* | 12/2013 | Shimizu | G01C 21/34 701/533 |
| 2014/0118754 A1* | 5/2014 | Nakamoto | G06F 3/1208 358/1.2 |
| 2014/0200803 A1* | 7/2014 | Kinoshita | G01C 21/3676 701/428 |
| 2014/0306991 A1* | 10/2014 | Kalai | G06T 1/60 345/630 |
| 2015/0066366 A1* | 3/2015 | Pang | G01C 21/32 701/532 |
| 2015/0168160 A1* | 6/2015 | Siliski | G01C 21/34 701/410 |
| 2015/0177013 A1* | 6/2015 | Siliski | G01C 21/20 701/433 |
| 2015/0230056 A1* | 8/2015 | Shin | G01C 21/36 455/420 |
| 2015/0247732 A1* | 9/2015 | Yano | G09B 29/10 701/533 |

FOREIGN PATENT DOCUMENTS

| | | |
|---|---|---|
| JP | 2008027067 A | 2/2008 |
| JP | 2008-74275 A | 4/2008 |
| JP | 2008-283386 A | 11/2008 |
| JP | 2010-250616 A | 11/2010 |
| JP | 2011053163 A | 3/2011 |
| JP | 2011-95929 A | 5/2011 |
| JP | 2013-104871 A | 5/2013 |
| KR | 10-2010-0003781 A | 1/2010 |
| KR | 2010-0044317 A | 4/2010 |

OTHER PUBLICATIONS

Decision to Grant dated Aug. 3, 2016 issued in Korean Patent Application No. 10-2014-0122560 (with partial English translation).

Korean Office Action dated Aug. 3, 2015 issued in Korean Patent Application No. 10-2014-0122560 (English translation).

* cited by examiner

Fig. 10
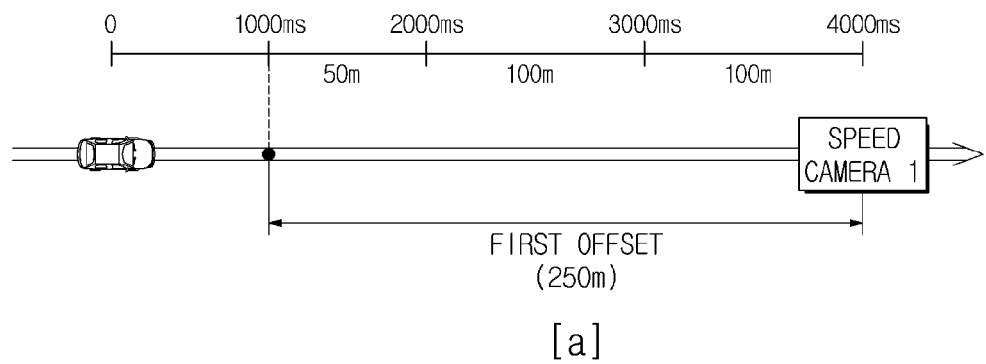
[a]
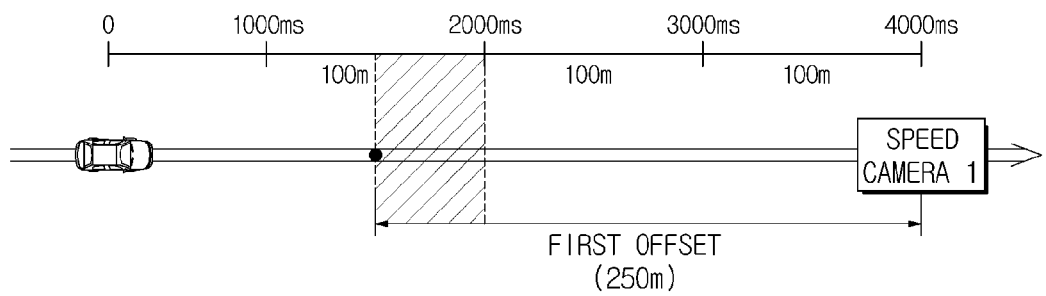
[b]
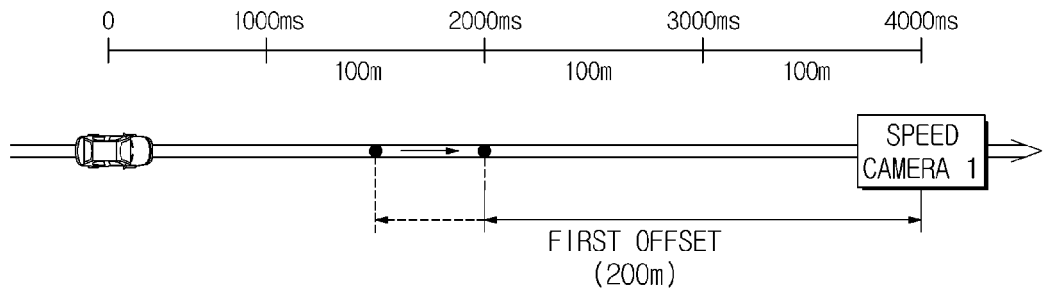
[c]

DRIVING ASSISTANCE APPARATUS, AND CONTROL METHOD THEREOF

CROSS-REFERENCE TO RELATED APPLICATION

This application claims the benefit of Korean Patent Application No. 2014-0122560, filed on Sep. 16, 2014 in the Korean Intellectual Property Office, the disclosure of which is incorporated herein by reference.

BACKGROUND

1. Field

Present disclosure relates to a driving assistance apparatus of assisting a user's driving based on map information, and a method of controlling the driving assistance apparatus.

2. Description of the Related Art

A driving assistance apparatus is an equipment to assist driving of means of transportation, such as a vehicle or a plane. The driving assistance apparatus creates data for assisting a users driving or controls the user's driving, based on information received from another driving assistance apparatus.

As examples of the driving assistance apparatus, Advanced Driver Assistance Systems (ADAS), such as Lane Departure Warning System (LDWS), Collision Warning System (CWS), blind spot monitoring system, and Pedestrian Collision Warning System (PCWS), have been introduced by combining several camera sensors with intelligent image processing technology.

The driving assistance apparatus performs various functions based on map information. Lately, along with application expansion of map information, an amount of map information required by the driving assistance apparatus is increasing exponentially. However, a large amount of map information may overload the driving assistance apparatus when the driving assistance apparatus transmits and uses the map information. Accordingly, a method for improving such overload is needed.

SUMMARY

In accordance with one aspect of the present disclosure, a driving assistance apparatus includes: a storage configured to store map information; and a communication device configured to transmit location information to another driving assistance apparatus at predetermined time periods, wherein the communication device transmits the map information to the other driving assistance apparatus if a target of the map information changes.

If a target is found within a predetermined spatial range, the communication device may transmit map information for the target to the other driving assistance apparatus.

If the target is found within the predetermined spatial range, the communication device may transmit the map information for the target and information about the predetermined spatial range to the other driving assistance apparatus.

The storage may store a plurality of pieces of map information, and the predetermined spatial range may be set for a target of each piece of map information.

If the target of the map information changes, the communication device may transmit at least one information of information about a distance to the changed target and information about an estimated time of arrival at the changed target to the other driving assistance apparatus.

The driving assistance apparatus may further include a controller configured to calculate at least one of the distance to the changed target and the estimated time of arrival at the changed target.

If the target of the map information changes, the communication device may transmit the map information to the other driving assistance apparatus at a next transmission time of the location information.

The driving assistance apparatus may further include a controller configured to calculate at least one of a distance between the changed target and the driving assistance apparatus and an estimated time of arrival at the changed target, wherein the controller may calculate at least one of the distance between the changed target and the driving assistance apparatus at the next transmission time of the location information and the estimated time of arrival at the changed target at the next transmission time of the location information, and the communication device may transmit the at least one of the distance between the changed target and the driving assistance apparatus at the next transmission time of the location information and the estimated time of arrival at the changed target at the next transmission time of the location information, together with the map information, to the other driving assistance apparatus.

The map information may include at least one information among setting information of the other driving assistance apparatus, road condition information, path attribute information, and diverge information.

The driving assistance apparatus may further include a controller configured to assign a priority to the map information, wherein the storage may store a plurality of pieces of map information to which priorities have been assigned, and the communication device may transmit the map information according to the priority.

The controller may assign the priority to the map information according to a distance between the target of the map information and the driving assistance apparatus.

The controller may assign the priority to the map information according to a predetermined degree of importance of the map information.

The driving assistance apparatus may be an Audio Video Navigation (AVN) apparatus.

The communication device may transmit the map information to the other driving assistance apparatus one time if the target of the map information changes.

In accordance with another aspect of the present disclosure, a driving assistance apparatus includes: a communication device configured to receive map information and location information; and a controller configured to calculate at least one of a distance between a target of the map information and the driving assistance apparatus and an estimated time of arrival at the target of the map information, based on location information received at predetermined time periods.

The driving assistance apparatus may further include a display configured to display at least one of the distance between the target of the map information and the driving assistance apparatus and the estimated time of arrival, calculated by the controller, for a user.

The communication device may transmit at least one of the distance between the target of the map information and the driving assistance apparatus and the estimated time of arrival at the target of the map information, calculated by the controller, another driving assistance apparatus.

The communication device may receive a plurality of pieces of map information and a plurality of offsets corresponding to the respective pieces of map information, and the controller may calculate at least one of a distance between a target of each piece of the map information and the driving assistance apparatus and an estimated time of arrival at the target of the piece of the map information, based on the location information received at the predetermined time periods and the offsets.

The driving assistance apparatus may further include a storage configured to store the distance between the target of the map information and the driving assistance apparatus and the estimated time of arrival at the target of the map information.

In accordance with another aspect of the present disclosure, a control method of a driving assistance apparatus includes: transmitting location information to another driving assistance apparatus at predetermined time periods; extracting map information; and transmitting the map information to the other driving assistance apparatus if a target of the map information changes.

The control method may further include, before the transmitting of the location information, receiving location information of the driving assistance apparatus.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 10 is a view for describing offset synchronization of a controller according to an embodiment of the present disclosure;

DETAILED DESCRIPTION

Figure 1A:
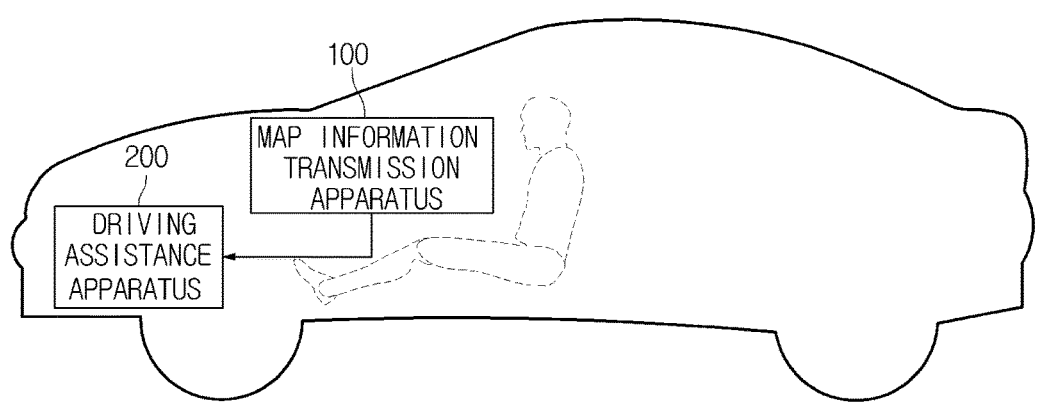
FIGS. 1A to 3 are views for describing external appearances of driving assistance apparatuses.

It is an aspect of the present disclosure to provide a driving assistance apparatus capable of preventing overload when transmitting and using map information, and a method of controlling the driving assistance apparatus.

It is another aspect of the present disclosure to provide a driving assistance apparatus capable of controlling transmission and use of map information to prevent overlapping transmission and use of map information, and a method of controlling the driving assistance apparatus.

It is still another aspect of the present disclosure to provide a driving assistance apparatus capable of controlling transmission of map information such that the map information is suitable for a vehicle communication environment, and a method of controlling the driving assistance apparatus.

Additional aspects of the disclosure will be set forth in part in the description which follows and, in part, will be obvious from the description, or may be learned by practice of the disclosure. Purposes, advantages, and features of the present disclosure will be apparent by referring to embodiments described below in connection with the accompanying drawings. In this specification, like numbers refer to like elements throughout the description of the figures. In the following description, if it is determined that detailed descriptions for related art make the subject matter of the present disclosure obscure unnecessarily, the detailed descriptions will be omitted. In this specification, the terms "first" and "second", as applied to detectable species, are used for the purposes of identification and do not imply any order of detection.

Hereinafter, driving assistance apparatuses will be described with reference to FIGS. 1A to 3. FIGS. 1A to 3 are views for describing external appearances of driving assistance apparatuses.

A driving assistance apparatus is equipment to assist driving of means of transportation, such as a vehicle or a plane. The driving assistance apparatus creates data for assisting a user's driving or controls the users driving, based on information received from another driving assistance apparatus. In the following description, an example in which a driving assistance apparatus is used to assist driving of a vehicle will be given, however, the driving assistance apparatus can be used to assist various means of transportation, such as a plane, a ship, and a train, requiring a user's driving.

The driving assistance apparatus may be Advanced Driver Assistance System (ADAS), such as a map information transmission apparatus that stores map information for driving, Lane Departure Warning System (LDWS), Collision Warning System (CWS), blind spot monitoring system, and Pedestrian Collision Warning System (PCWS). However, the driving assistance apparatus is not limited to the above-mentioned apparatuses, and may be an arbitrary apparatus for assisting a user's driving.

The map information transmission apparatus may store map information collected through Global Positioning System (GPS) or wired/wireless network signals. The map information transmission apparatus may be an Audio Video Navigation (AVN) apparatus.

The AVN apparatus is configured by integrating audio system, multimedia system, and navigation system into one system in a vehicle. The AVN apparatus may provide a radio service, an audio service (e.g., a Compact Disk (CD) player), a video service (e.g., a Digital Versatile Disk (DVD) player), and a navigation service with a destination guide function. Also, the AVN apparatus may be configured with a Universal Serial Bus (USB) port that is connected to a portable device for multimedia, such as a Portable Multimedia Player (PMP), a MPEG Audio Layer-3 (MP3) player, and a Personal Digital Assistants (PDA), to reproduce audio/video files.

The map information transmission apparatus may store "map information" including information about various targets existing on a map, or state information of system related to the map information transmission apparatus. The map information may be used by another driving assistance apparatus to perform various driving assistance operations.

The map information may be grouped into location information, setting information, road condition information, path attribute information, point information, diverge information, and other information. The location information represents a current location of the vehicle, and may include absolute location coordinates, relative location coordinates with respect to a specific target, and a mileage of the vehicle. The setting information is state information of system related to the map information transmission apparatus, and may include various system setting information, such as country information, a display of speed, a version of a stored map, handle information, and hardware version information. The road condition information represents the conditions of one or more roads existing on the map, and may include a speed limit, the number of lanes, existence of a tunnel, bridge information, etc. The path attribute information represents the conditions of a road that change during driving, and may include section information and point information. The section information may include information related to curvature of a turnoff or a curved road, a grade representing a degree of slope of a road, and a safety driving zone. The point information may include the locations of speed cameras, the locations of various facilities, such as a rest area and a tollgate, and information related to a safety driving point. The diverge information may include information related to a point including a turnoff, and an entry or exit point of a turnoff. The other information may include information about other targets existing on the map.

Meanwhile, the map information transmission apparatus may connect to another driving assistance apparatus to share necessary information with the driving assistance apparatus. In the following description, for convenience of description, a driving assistance apparatus to transmit map information is referred to as a map information transmission apparatus 100, and a driving assistance apparatus to receive map information and to perform various control operations for driving assistance is referred to as a driving assistance apparatus 200.

Referring to FIGS. 1A to 3, the map information transmission apparatus 100 may be provided in the front area of a vehicle to audiovisually provide various map information to a user. However, the map information transmission apparatus 100 may be provided in the back or side area of the vehicle, instead of the front area of the vehicle.

Referring to FIG. 1A, the map information transmission apparatus 100 may connect to the driving assistance apparatus 200 through a network, and receive/transmit necessary information from/to the driving assistance apparatus 200. Herein, the network may be a wired network (e.g., a Local Area Network (LAN), a Wide Area Network (WAN), a Value Added Network (VAN), or a Controller Area Network (CAN)) or a wireless network (e.g., a mobile radio communication network or a satellite communication network). In the following description, it is assumed that the map information transmission apparatus 100 connects to the driving assistance apparatus 200 through a CAN.

Figure 1B:
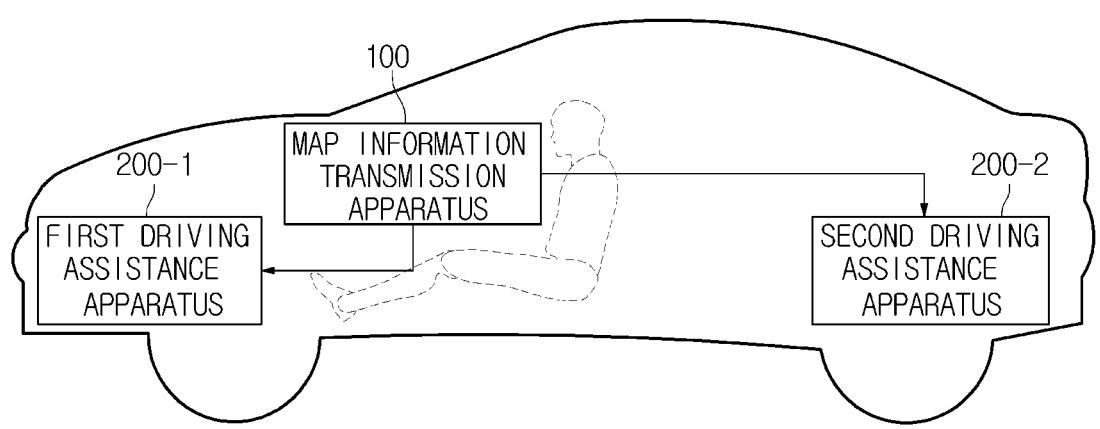

Also, referring to FIG. 1B, the map information transmission apparatus 100 may connect to a plurality of driving assistance apparatuses (that is, first and second driving assistance apparatuses 200-1 and 200-2) through a network, and share information required or acquired by the first and/or second driving assistance apparatus 200-1 and/or 200-2. Information required or acquired by the first driving assistance apparatus 200-1 may be the same as information required or acquired by the second driving assistance apparatus 200-2.

Figure 2:
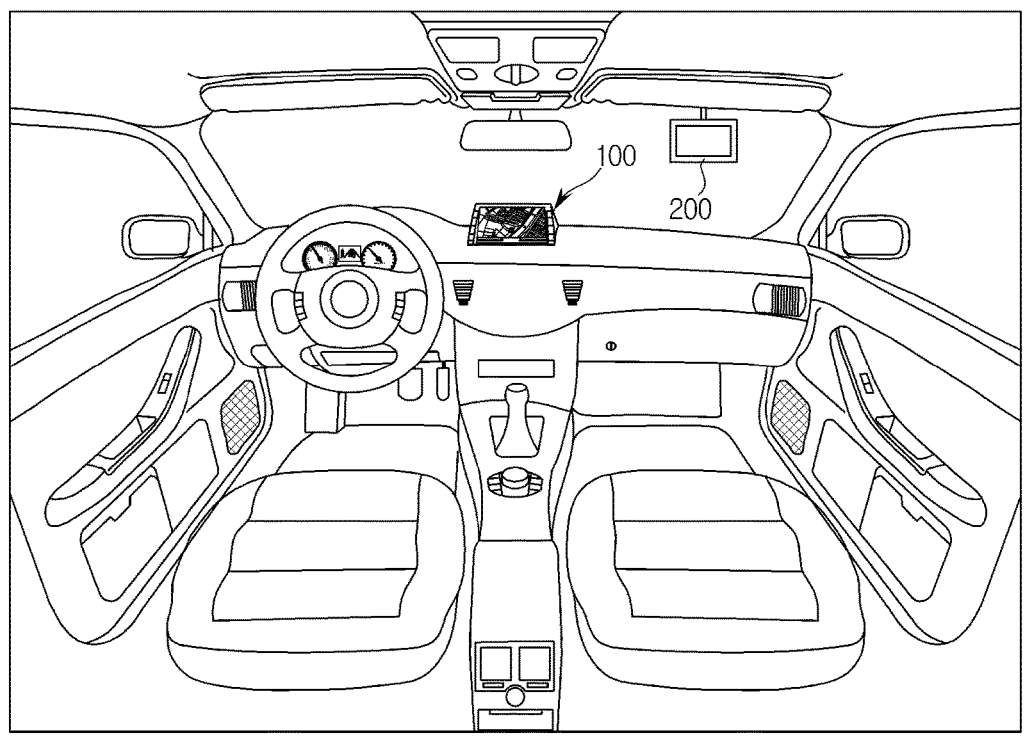
Figure 3:
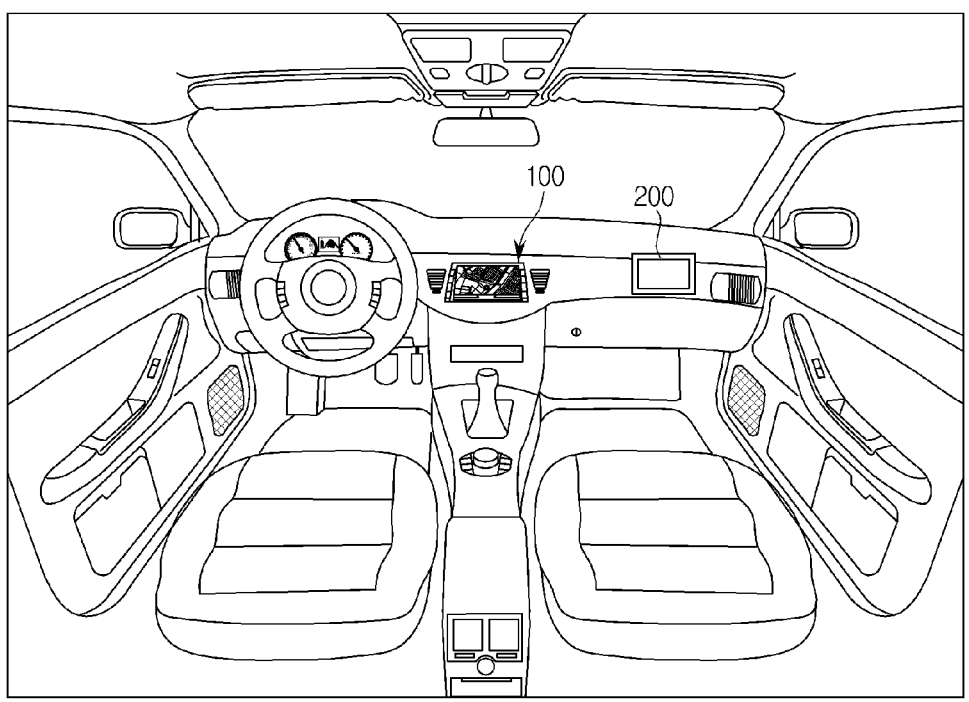

Referring to FIG. 2, the map information transmission apparatus 100 and the driving assistance apparatus 200 may be removably installed at a user's desired locations inside the vehicle. Also, referring to FIG. 3, the map information transmission apparatus 100 and the driving assistance apparatus 200 may be fixedly installed inside the vehicle.

Figure 4:
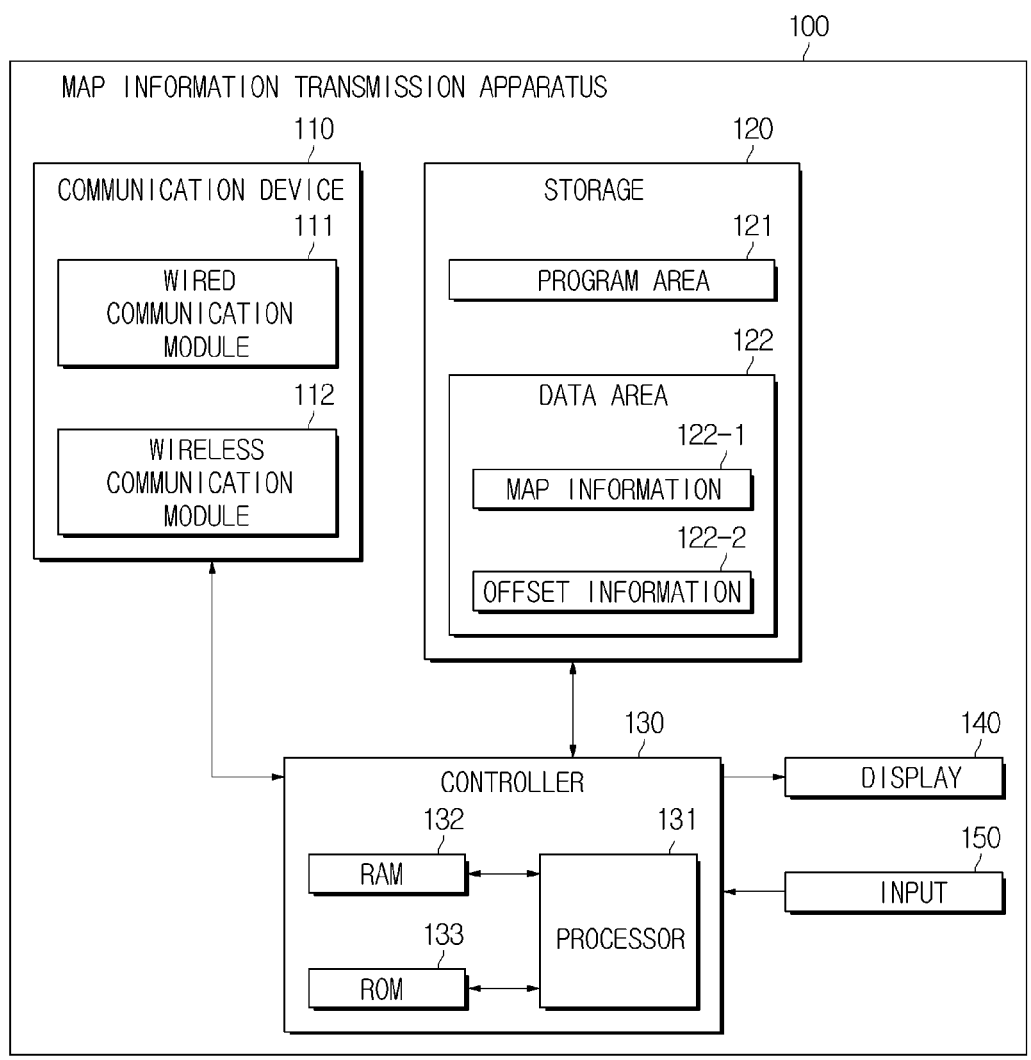
FIG. 4 is a block diagram of a map information transmission apparatus according to an embodiment of the present disclosure.
Figure 5:
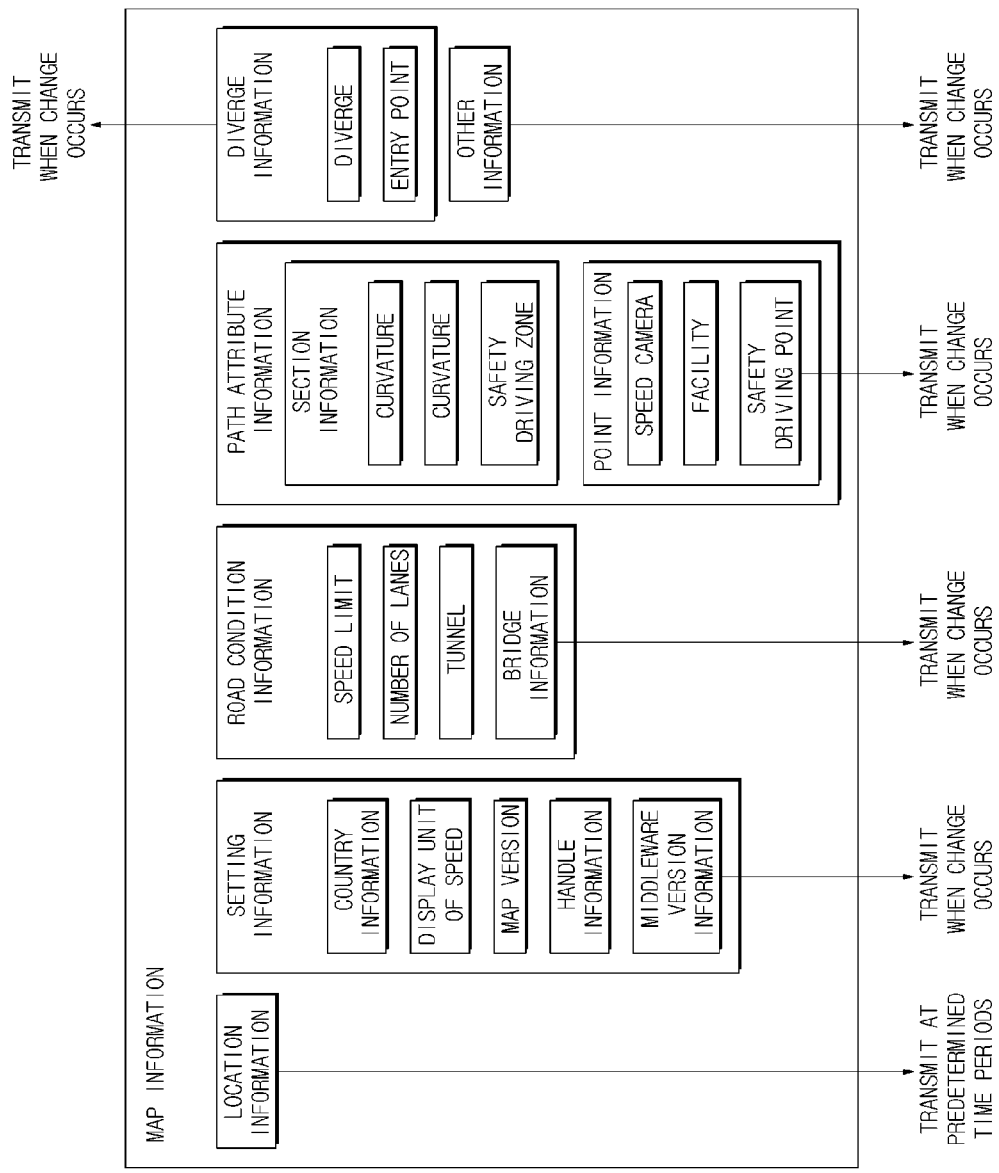
FIG. 5 is a view for describing map information stored in the map information transmission apparatus of FIG. 4.

Hereinafter, a configuration of the map information transmission apparatus 100 and a control method of the map information transmission apparatus 100 will be described with reference to FIGS. 4 and 5. FIG. 4 is a block diagram of the map information transmission apparatus 100 according to an embodiment of the present disclosure, and FIG. 5 is a view for describing map information stored in the map information transmission apparatus 100.

Referring to FIG. 4, the map information transmission apparatus 100 may include a communication device 110 to connect to a network, a storage 120 to store user data and programs for performing control operations, a controller 130 to control functions of individual components of the map information transmission apparatus 100, a display 140 to audiovisually display map information for a user, and an input 150 to receive commands from a user.

The communication device 110 may collect map information through a wired/wireless network, and transmit the collected map information to the driving assistance apparatus 200 (see FIG. 1A) using a control method according to an embodiment of the present disclosure. The network may be a wired network (e.g., LAN, WAN, VAN, or CAN) or a wireless network (e.g., a mobile radio communication network or a satellite communication network). The communication device 110 may include a wired communication module 111 to connect to a wired network, and a wireless communication module 112 to connect to a wireless network.

Map information may have been stored in an external memory card inserted into the map information transmission apparatus 100, or in the map information transmission apparatus 100. Also, the map information stored in the map information transmission apparatus 100 may be upgraded through the network. The map information may be grouped into location information, setting information, road condition information, path attribute information, point information, diverge information, and other information.

According to an embodiment, the communication device 110 may collect information about a current location of the vehicle through the GPS, and the other map information through the mobile communication network. The collected location information and the other information may be stored in the storage 120 which will be described later, or transmitted to another driving assistance apparatus 200. For convenience of description, the map information is assumed to be collected through the GPS and the mobile communication network, however, the map information may be collected through any other wired/wireless networks.

Referring to FIGS. 4 and 5, the communication device 110 may transmit location information of the vehicle to the driving assistance apparatus 200 (see FIG. 1A) through the CAN, at predetermined time periods, under the control of the controller 130. More specifically, if a transmission time period is set to 1000 ms, the communication device 110 may transmit location information of the vehicle collected through the GPS to the driving assistance apparatus 200 in units of 1000 ms, that is, at 1000 ms, 2000 ms, 3000 ms, . . . .

Meanwhile, the communication device 110 may transmit setting information, road condition information, path attribute information, point information, diverge information, and other information, which are map information except for location information that is transmitted at predetermined time periods, to the driving assistance apparatus 200 only when a target of map information changes, through the CAN. More specifically, if a target of map information required by the driving assistance apparatus 200 changes according to lapse of driving time, a change of driving space, or a user's selection, the communication device 110 may transmit map information to the driving assistance apparatus 200 one time through the network. Cases in which a target of map information changes may include a case in which a target of map information changes or is added within a spatial range set by the vehicle, the map information transmission apparatus 100, or the driving assistance apparatus 200 according to driving of the vehicle, a case in which a target of map information changes or is added according to a request from the driving assistance apparatus 200, and a case in which a target of map information changes or is added according to a user's input.

According to an embodiment, if a speed camera 1 is found within a spatial range (for example, within 1000 m ahead) set by the vehicle, the map information transmission apparatus 100, or the driving assistance apparatus 200, the communication device 110 may transmit map information related to the speed camera 1 to the driving assistance apparatus 200. Meanwhile, the spatial range may include an estimated time of arrival as well as a distance. If the spatial range is set to an estimated time of arrival of 10 seconds, and a speed camera 1 is found within a spatial range corresponding to the estimated time of arrival of 10 seconds, the communication device 110 may transmit map information related to the speed camera 1 to the driving assistance apparatus 200. In this case, the communication device 110 may transmit information about the spatial range, together with the map information, to the driving assistance apparatus 200, wherein the spatial range may function as an "offset" which will be described later. Also, it is possible to set different spatial ranges for individual targets of map information.

According to another embodiment, if a target of map information required by the driving assistance apparatus 200 changes from a speed camera 1 to a speed camera 2, the communication device 110 may transmit map information related to the speed camera 2 to the driving assistance apparatus 200.

According to another embodiment, if a speed camera 1 is input as a target of map information by a user, that is, if a target of map information is added, the communication device 110 may transmit map information related to the speed camera 1 to the driving assistance apparatus 200. The user may change or add a target of map information by inputting the target of map information through the input 150 which will be described later.

That is, when a target of map information changes to another target or a new target is added, the communication device 110 may transmit map information related to the changed or added target one time, instead of transmitting the map information related to the target at predetermined time periods, like location information, thereby preventing overlapping transmission of map information.

Also, since the communication device 110 transmits map information only when a target of the map information changes, it is possible to prevent overload upon transmission of map information.

Meanwhile, the communication device 110 may transmit information about a distance to the target of the map information or information about an estimated time of arrival at the target of the map information, in addition to the map information, to the driving assistance apparatus 200. In the following description, the distance to the target of the map information or the estimated time of arrival at the target of the map information is referred to as an "offset".

An offset may be set to different values according to the characteristics of map information. For example, an offset may be set to 1000 ms if map information is setting information, to 2000 ms if map information is road condition information, to 1000 ms if map information is diverge information, and to 4000 ms if map information is other information.

Also, an offset may be set to different values according to individual targets of map information although the map information has the same characteristics. For example, an offset may be set to an estimated time of arrival of 3000 ms if a target of map information is a speed camera 1, to an estimated time of arrival of 3000 ms if a target of map information is a speed camera 2, and to an estimated time of arrival of 2000 ms if a target of map information is a speed camera 3.

Figure 6:
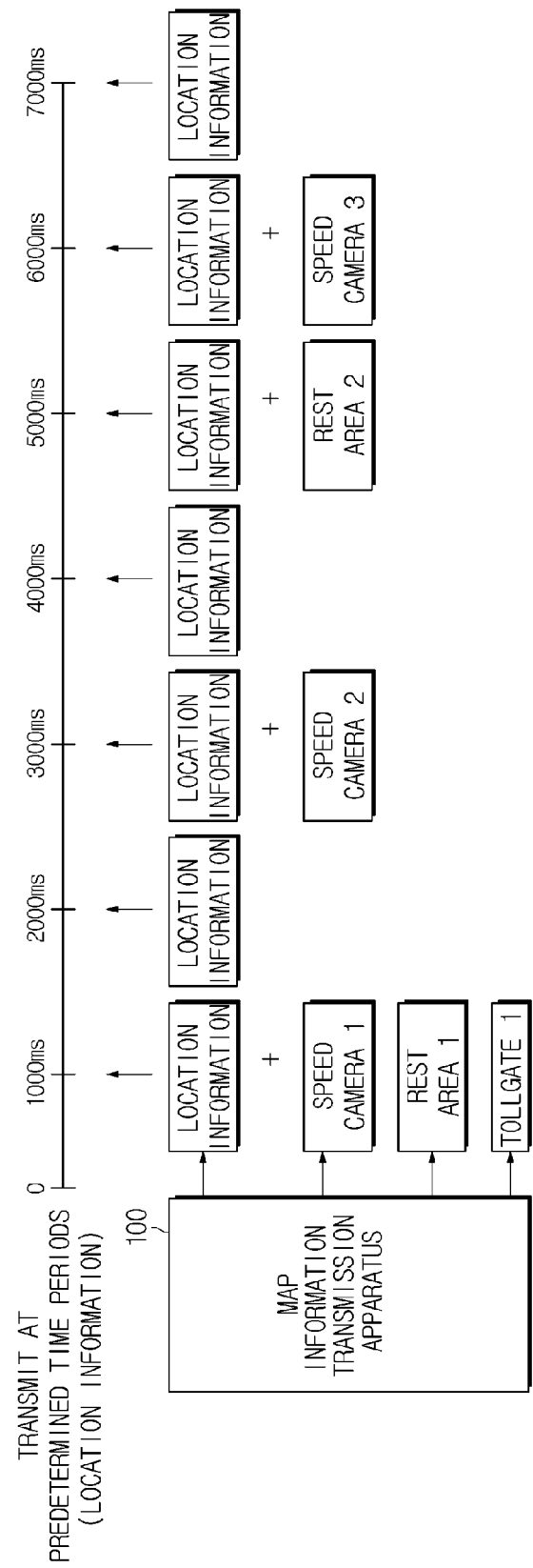
FIG. 6 is a view for describing times at which a communication device transmits a plurality of pieces of map information.

Also, when a target of map information changes, the communication device 110 may transmit a plurality of pieces of map information, together with offsets for individual targets of the plurality of pieces of map information. FIG. 6 is a view for describing times at which the communication device 110 transmits a plurality of pieces of map information. Referring to FIG. 6, if it is determined that targets of map information change to other targets (for example, a speed camera 1, a rest area 1, and a tollgate 1) during a time period from 0 ms to 1000 ms while location information is transmitted at predetermined time periods, the communication device 110 may transmit map information for the speed camera 1, the rest area 1, and the tollgate 1 to the driving assistance apparatus 200, at a time of 1000 ms, together with location information, and also transmit offsets for the speed camera 1, the rest area 1, and the tollgate 1 to the driving assistance apparatus 200. Thereafter, if it is determined that the targets of the map information change to another target (for example, a speed camera 2) during a time period from 2000 ms to 3000 ms, the communication device 110 may transmit map information for the speed camera 2 to the driving assistance apparatus 200 at a time of 3000 ms, together with location information, and also transmit an offset for the speed camera 2 to the driving assistance apparatus 200. Thereafter, if it is determined that the target of the map information changes to another target (for example, a rest area 2) during a time period from 4000 ms to 5000 ms, the communication device 110 may transmit map information for the rest area 2 to the driving assistance apparatus 200 at a time of 5000 ms, together with location information, and also transmit an offset for the rest area 2 to the driving assistance apparatus 200. Thereafter, if it is determined that the target of the map information changes to another target (for example, a speed camera 3) during a time period from 5000 ms to 6000 ms, the communication device 110 may transmit map information for the speed camera 3 to the driving assistance apparatus 200 at a time of 6000 ms, together with location information, and also transmit an offset for the speed camera 3 to the driving assistance apparatus 200.

As such, since the communication device 110 transmits both map information and an offset when a target changes, transmits map information at a set time, and transmits location information at predetermined time periods, the driving assistance apparatus 200 which will be described later may calculate a distance to the target or an estimated time of arrival at the target based on the location information.

Referring again to FIG. 4, the storage 120 may include a program area 121 and a data area 122 to store programs and data related to the map information transmission apparatus 100, wherein the program area 121 may store programs for performing functions of the map information transmission apparatus 100, and the data area 122 may store data, such as map information 122-1 and offset information 122-2, which is generated according to use of the map information transmission apparatus 100. The stored data may be displayed for the user through the display 140.

As described above, map information stored in the data area 122 may be grouped into location information, setting information, road condition information, path attribute information, point information, diverge information, and other information. The location information represents a current location of the vehicle, and may include absolute location coordinates, relative location coordinates with respect to a specific target, and a mileage of the vehicle. The setting information is state information of system related to the map information transmission apparatus 100, and may include various system setting information, such as country information, a display of speed, a version of a stored map, handle information, and hardware version information. The road condition information represents the conditions of one or more roads existing on the map, and may include a speed limit, the number of lanes, existence of a tunnel, bridge information, etc. The path attribute information represents the conditions of a road that change during driving, and may include section information and point information. The section information may include information related to curvature of a turnoff or a curved road, a grade representing a degree of slope of a road, and a safety driving zone. The point information may include the locations of speed cameras, the locations of various facilities, such as a rest area and a tollgate, and information related to a safety driving point. The diverge information may include information related to a point including a turnoff, and an entry or exit point of a turnoff. The other information may include information about other targets existing on the map. Also, the map information may be navigation information stored in a general AVN apparatus.

Meanwhile, in FIG. 4, a case in which the controller 130 includes Read Only Memory (ROM) 133 to store control programs for controlling the map information transmission apparatus 100, and Random Access Memory (RAM) 132 used as a storage area for various tasks that are performed by the map information transmission apparatus 100 is shown. However, the ROM 133 and the RAM 132 may be included in the storage 120, instead of the controller 130. Also, the storage 120 may be implemented as a mobile device that can be inserted into the map information transmission apparatus 100, instead of being fixedly installed in the map information transmission apparatus 100.

Also, the storage 120 may be implemented as an independent device separated from the controller 130, as shown in FIG. 4. However, the storage 120 may be included in the controller 130. In this case, the storage 120 may be connected to components constituting the controller 130 on a board or in an apparatus.

The controller 130 may control overall operations of the map information transmission apparatus 100. More specifically, the controller 130 may include a processor 131, the ROM 133 to store control programs for controlling the map information transmission apparatus 100, and the RAM 132 to store signals or data received from external devices, and used as a storage area for various tasks that are performed by the map information transmission apparatus 100.

In addition, there may be provided a graphic processing board (not shown) including the processor 131, the RAM 132, or the ROM 133 on a separate circuit substrate electrically connected to the controller 130. The processor 131, the RAM 132, and the ROM 133 may be connected to each other through internal buses. Also, the controller 130 can be used as a term indicating any component including the processor 131, the ROM 133, and the RAM 132. Also, the controller 130 can be used as a term indicating any component including the processor 131, the ROM 133, the RAM 132, and the graphic processing board.

According to an embodiment, the controller 130 may enable location information to be transmitted at predetermined time periods to the driving assistance apparatus 200. In this case, the controller 130 may set a time period per which location information is transmitted, and transmit location information per the time period. The time period may be set when the map information transmission apparatus 100 is manufactured, or may be set by a user through the input 150.

Also, the controller 130 may determine whether a target of map information (for example, setting information or road condition information) except for location information changes. If the controller 130 determines that no target of map information changes, the controller 130 may wait without causing the communication device 110 to transmit map information, and if the controller 130 determines that a target of map information changes, the controller 130 may cause the communication device 110 to transmit map information to the driving assistance apparatus 200. That is, if the controller 130 determines that a target of map information required by the driving assistance apparatus 200 changes according to lapse of driving time, a change of driving space, or a user's selection, the controller 130 may cause the communication device 110 to transmit map information to the driving assistance apparatus 200 one time through the network.

Figure 7:
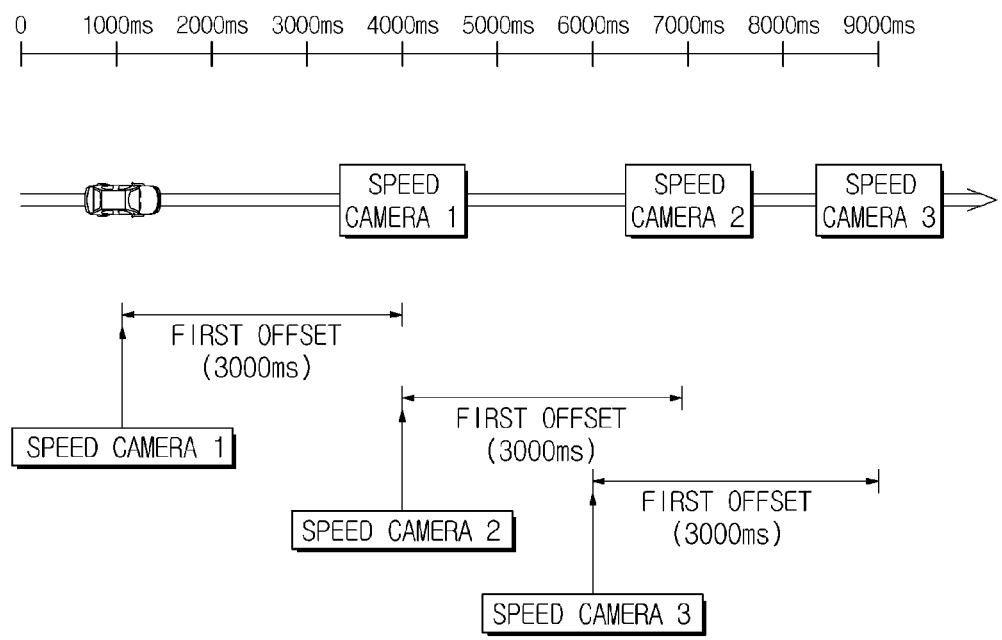
FIG. 7 is a view for describing an example of a method of determining whether a target of map information changes.

According to an embodiment, whether a target of map information changes may be determined based on whether a target of map information changes or is added within a spatial range set by the vehicle, the map information transmission apparatus 100, or the driving assistance apparatus 200 according to driving of the vehicle. For example, if a speed camera 1 is newly found within a spatial range (for example, within 1000 m ahead) set by the vehicle, the map information transmission apparatus 100, or the driving assistance apparatus 200, the controller 130 may determine that a target of map information changes, and control the communication device 110 to transmit map information related to the speed camera 1 to the driving assistance apparatus 200. Meanwhile, the spatial range may include an estimated time of arrival as well as a distance, and may function as an offset, as described above. FIG. 7 is a view for describing an example of a method of determining whether a target of map information changes.

Figure 8:
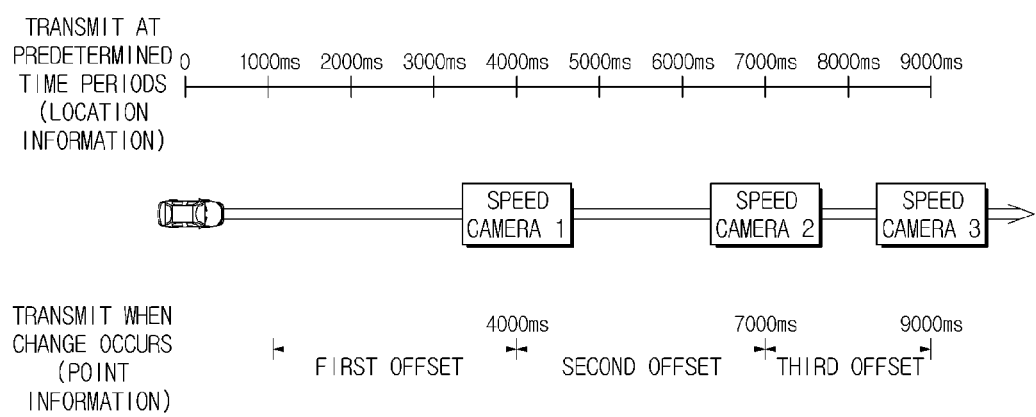
FIGS. 8 and 9 are views for describing offsets calculated with respect to changed targets of map information.

Referring to FIG. 7, if a spatial range (offset) is set to an estimated time of arrival of 3000 ms, and the controller 130 determines that a speed camera 1 is found within the spatial range during a time period from 0 ms to 1000 ms, the controller 130 may determine that map information changes, and control the communication device 110 to transmit map information for the speed camera 1. Also, if a spatial range (offset) is set to an estimated time of arrival of 3000 ms, and the controller 130 determines that a speed camera 2 is found within the spatial range during a time period from 3000 ms to 4000 ms, the controller 130 may determine that map information changes, and control the communication device 110 to transmit map information for the speed camera 2. Also, if a spatial range (offset) is set to an estimated time of arrival of 3000 ms, and the controller 130 determines that a speed camera 3 is found within the spatial range during a time period from 5000 ms to 6000 ms, the controller 130 may determine that map information changes, and control the communication device 110 to transmit map information for the speed camera 3. However, if there are a plurality of targets (a speed camera 2 and a speed camera 3) having the same characteristic (point information in the case of FIG. 7) of map information, the controller 130 may control the communication device 110 to not transmit map information for another target (speed camera 3) until the vehicle passes a target (speed camera 2). In this case, the controller 130 may control the communication device 110 to transmit map information for the other target (speed camera 3) at a time of 7000 ms at which the vehicle passed the target (speed camera 2). Also, at the time of 7000 ms at which the vehicle passed the target, an offset for the other target (speed camera 3) may change, as shown in FIG. 8.

According to another embodiment, whether a target of map information changes may be determined based on whether a target of map information changes or is added according to a request from the driving assistance apparatus 200. For example, if a target of map information changes from a speed camera 1 to a speed camera 2 according to a request from the driving assistance apparatus 200, the controller 130 may determine that a target of map information changes, and control the communication device 110 to transmit map information for the speed camera 2 to the driving assistance apparatus 200.

According to still another embodiment, whether a target of map information changes may be determined based on whether a target of map information changes or is added according to a user's input. For example, if a speed camera 1 is input as a target of map information by a user, the controller 130 may determine that a target of map information changes or is added, and control the communication device 110 to transmit map information related to the speed camera 1 to the driving assistance apparatus 200. The user may change or add a target of map information by inputting the target of map information through the input 150 which will be described later.

Figure 9:
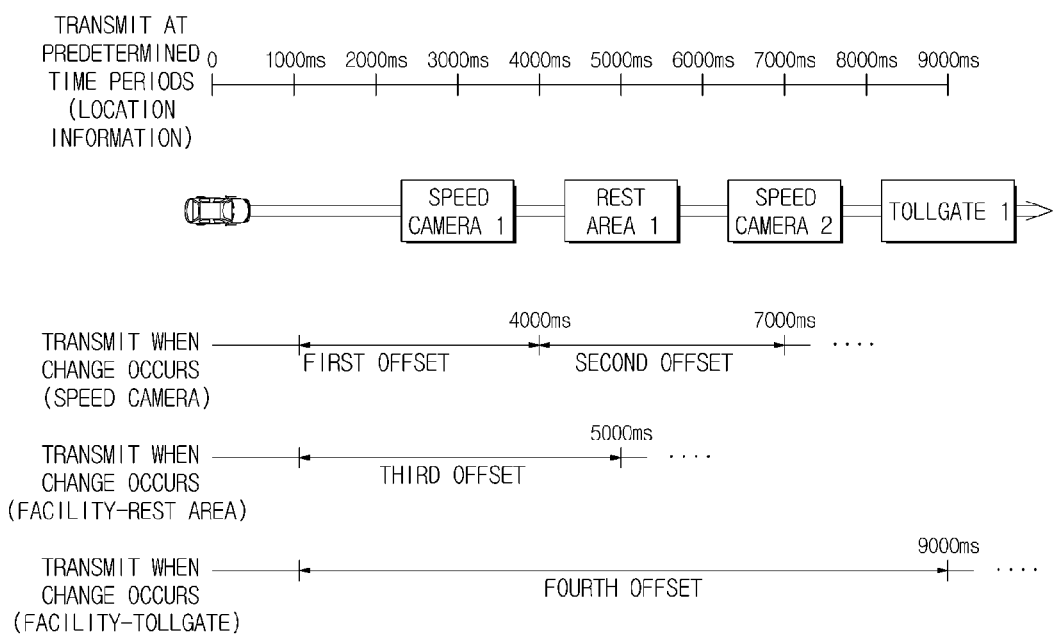

Meanwhile, in order for the communication device 110 to additionally transmit map offsets to the driving assistance apparatus 110, the controller 130 may calculate offsets for individual targets of map information. Also, in order to reduce an amount of computation, the controller 130 may calculate only an offset of a changed target, instead of calculating offsets for all targets of map information stored in the map information transmission apparatus 100. The offset may be calculated as a distance to the target or as an estimated time of arrival at the target. Also, the offset may be set to a predetermined value. Hereinafter, a case in which an offset is calculated as an estimated time of arrival at a target will be described as an example. FIGS. 8 and 9 are views for describing offsets calculated with respect to changed targets of map information.

Referring to FIG. 8, if a target (for example, a speed camera 1) of map information is added during driving of the vehicle, the controller 120 may calculate a difference (that is, 3000 ms) between a time of 4000 ms at which the vehicle arrives at an estimated location of the speed camera 1 and a time of 1000 ms at which location information is transmitted next, as a first offset. Thereafter, if the target of map information changes to a speed camera 2, the controller 130 may calculate a difference (that is, 3000 ms) between a time of 7000 ms at which the vehicle arrives at an estimated location of the speed camera 2 and a time of 4000 ms at which location information is transmitted next, as a second offset. Thereafter, if the target of map information changes to a speed camera 3, the controller 130 may calculate a difference (that is, 2000 ms) between a time of 9000 ms at which the vehicle arrives at an estimated location of the speed camera 3 and a time of 7000 ms at which location information is transmitted next, as a third offset. In this case, since the time at which the speed camera 1 is added is between 0 ms and 1000 ms after the vehicle starts, the time at which the speed camera 1 changes to the speed camera 2 is between 3000 ms and 4000 ms, and the time at which the speed camera 2 changes to the speed camera 3 is between 6000 ms and 7000 ms, the time at which location information is transmitted next when the speed camera 1 is added as a target of map information becomes 1000 ms, the time at which location information is transmitted next when the speed camera 1 changes to the speed camera 2 as a target of map information becomes 4000 ms, and the time at which location information is transmitted next when the speed camera 2 changes to the speed camera 3 as a target of map information becomes 7000 ms. Location information may be transmitted at predetermined time periods, that is, at 1000 ms, 2000 ms, 3000 ms, 4000 ms, . . . , 9000 ms. The first offset may be transmitted at the time of 1000 ms together with map information for the speed camera 1 through the communication device 110, the second offset may be transmitted at the time of 4000 ms together with map information for the speed camera 2, and the third offset may be transmitted at the time of 9000 ms together with map information for the speed camera 3.

Meanwhile, according to another embodiment, the controller 130 may calculate offsets for individual targets of map information. This operation will be described with reference to FIG. 9, below.

Referring to FIG. 9, according to another embodiment, the controller 130 may calculate a plurality of different offsets for individual targets of map information, and the plurality of offsets may be transmitted together with a plurality of pieces of map information. For example, if a speed camera 1, a rest area 1, a speed camera 2, and a tollgate 1 are added as targets of map information during driving of the vehicle, the controller 130 may calculate a difference (that is, 3000 ms) between a time of 4000 ms at which the vehicle arrives at an estimated location of the speed camera 1 and a time of 1000 ms at which location information is transmitted next, as a first offset, calculate a difference (that is, 4000 ms) between a time of 5000 ms at which the vehicle arrives at an estimated location of the rest area 1 and the time of 1000 ms at which location information is transmitted next, as a third offset, and calculate a difference (that is, 8000 ms) between a time of 9000 ms at which the vehicle arrives at an estimated location of the tollgate 1 and the time of 1000 ms at which location information is transmitted next, as a fourth offset. Also, when the vehicle passed the time of 4000 ms, the controller 130 may calculate a difference (that is, 3000 ms) between a time of 7000 ms at which the vehicle arrives at an estimated location of the speed camera 2 and the time of 4000 ms at which location information is transmitted next, as a second offset, since the target of map information changes to the speed camera 2. Thereafter, if the target of map information changes to a speed camera 3 (not shown), the controller 130 may calculate a difference (that is, 2000 ms) between the time of 9000 ms at which the vehicle arrives at an estimated location of the speed camera 3 and the time of 7000 ms at which location information is transmitted next, as a fifth offset (not shown). The first offset may be transmitted at the time of 1000 ms together with map information for the speed camera 1, the second offset may be transmitted at the time of 4000 ms together with map information for the speed camera 2, the third offset may be transmitted at the time of 1000 ms together with map information for the rest area 1, and the fourth offset may be transmitted at the time of 1000 ms together with map information for the tollgate 1.

Also, according to another embodiment, the controller 130 may apply the same offset (for example, 3000 ms of FIG. 7) to individual targets of map information, as shown in FIG. 7.

Meanwhile, according to an embodiment, if no target of map information changes when location information is transmitted, the controller 130 may perform the following synchronization so that a distance between the target and the vehicle or an estimated time of arrival at the target at the time when an offset is transmitted can be accurately reflected. FIG. 10 is a view for describing offset synchronization of the controller 130 according to an embodiment of the present disclosure.

Referring to FIG. 10A, if a target of map information changes to a speed camera 1 at a time of 1000 ms when location information is transmitted, an offset (a first offset) may be transmitted as it is together with the map information since the first offset reflects an accurate distance (250 m) between the target (the speed camera 1) and the vehicle or a time of arrival at the target at the time of 1000 ms when the location information is transmitted.

However, referring to FIG. 10B, if a target of map information changes to the speed camera 1 at a time (for example, a time between 1000 ms and 2000 ms, a time between 2000 ms and 3000 ms, or a time between 3000 ms and 4000 ms) which is different from times (that is, 1000 ms, 2000 ms, 3000 ms, or 4000 ms) at which location information is transmitted, the offset (that is, the first offset of 250 m) cannot reflect an accurate distance (200 m) between the target (the speed camera 1) and the vehicle or a time of arrival at the target at the time of 2000 ms when location information is transmitted next. Accordingly, as shown in FIG. 10C, the controller 130 may calculate a distance (50 m) corresponding to a difference between the time at which the target changes and the time at which location information is transmitted next, or an estimated time of arrival at the target, and deduct the calculated distance from the first offset to create a new offset of 200 m. The created offset of 200 m may be transmitted together with map information at the time of 2000 ms when location information is transmitted next.

Also, according to another embodiment, if there is a large amount of map information that needs to be transmitted at the same time, the controller 130 may control the communication device 110 to transmit map information according to priorities by assigning the priorities to the map information. Hereinafter, a method in which the controller 130 assigns priorities to individual pieces of map information will be described with reference to FIG. 11.

According to an embodiment, the controller 130 may assign priorities to individual targets of map information according to distances between the targets of the map information and the vehicle and according to predetermined degrees of importance of the map information. More specifically, the controller 130 may assign a higher priority to a target of map information having a shorter distance to the vehicle (including the map information transmission apparatus 100 and the driving assistance apparatus 200 of FIG. 1). If two or more targets of map information have the same distance to the vehicle, the controller 130 may assign priorities to the targets according to predetermined degrees of importance of the map information, wherein the predetermined degrees of importance may be input by a user through the input 150 (see FIG. 4). The degrees of importance of map information may be set to decrease, for example, in the order of setting information, road condition information, section information of path attribute information, point information of path attribute information, diverge information, and other information. That is, the setting information may be set to have a higher priority than the road condition information, the section information of path attribute information, the point information of path attribute information, and the diverge information. The road condition information may be set to have a higher priority than the section information of path attribute information, the point information of path attribute information, and the diverge information. Meanwhile, the controller 130 may assign a highest priority to location information.

Also, the controller 130 may control the number of map information that is transmitted at a transmission time, according to the assigned priorities. For example, if a maximum number of map information (including location information) that can be transmitted at a transmission time is set to 4, the controller 130 may assign priorities to changed targets so that four pieces of map information or less can be transmitted at each transmission time.

Figure 11:
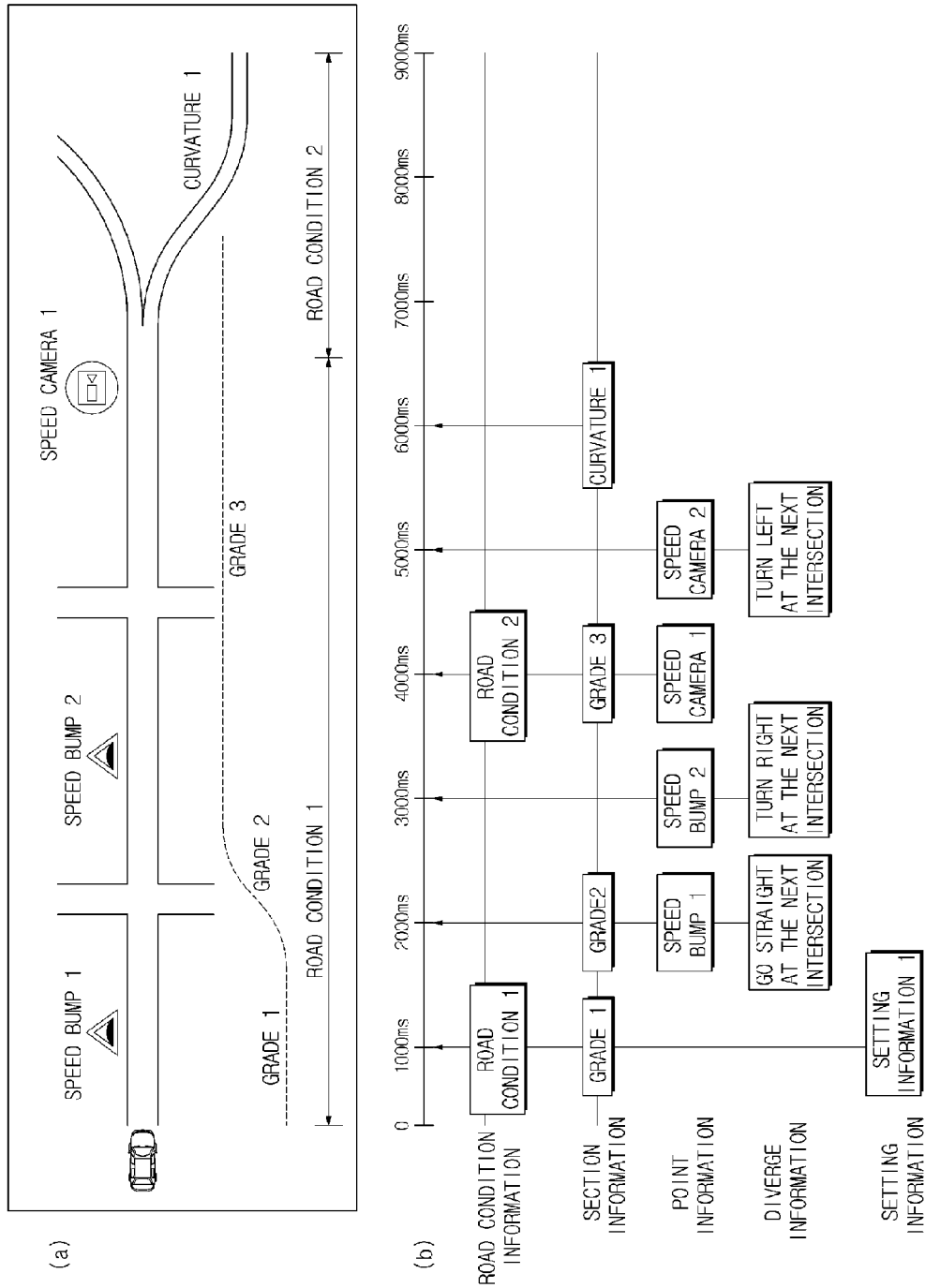
FIG. 11 is a view for describing transmission of map information with respect to individual targets to which priorities are assigned.

FIG. 11 is a view for describing transmission of map information with respect to individual targets to which priorities are assigned.

Referring to FIG. 11B shows transmission times of map information for a model driving path of FIG. 11A. If the number of map information that is transmitted at a transmission time is set to 4, and road condition information (road condition 1), section information (grade 1), point information (speed bump 1), diverge information (go straight at the next intersection), and setting information (setting information 1) change during a time period from 0 ms to 1000 ms, the controller 130 may assign higher priorities to the "road condition 1", the "grade 1", the "speed bump 1", and the "setting information 1" having the closer distances, than that assigned to the "go straight at the next intersection". The setting information may be considered to have the closest distance. Also, since degrees of importance of the "road condition 1", the "grade 1", the "speed bump 1", and the "setting information 1" having the same distance are higher in the order of the "setting information 1", the "road condition 1", "grade 1", and the "speed bump 1", the controller 130 may assign priorities according to the degrees of importance. Since location information is assigned a highest priority, the controller 130 may assign higher priorities to the map information in the order of location information, the "setting information 1", the "road condition 1", the "grade 1", the "speed bump 1", and the "go straight at the next intersection". Since the number of map information that is transmitted at a transmission time is limited to four, the controller 130 may control the communication device 110 to transmit map information for location information, the "setting information 1", the "road condition 1", and the "grade 1" at a time of 1000 ms, and to transmit map information for the "speed bump 1" and the "go straight at the next intersection", which have been not transmitted at the time of 1000 ms, at a time of 2000 ms that is the next transmission time. The map information for the "speed bump 1" and the "go straight at the next intersection", which have been not transmitted at the previous transmission time, are assigned high priorities next to location information, at the next transmission time.

Thereafter, if the section information changes to "grade 2" and the point information changes to "speed bump 2" during a time period from 1000 ms to 2000 ms, the controller 130 may assign high priorities to map information for the "speed bump 1" and "go straight at the next intersection" which have been not transmitted at the previous transmission time, next to location information, and assign a higher priority to the "grade 2" having the closer distance than to the "speed bump 2". As a result, the controller 130 may assign higher priorities in the order of location information, the "speed bump 1", the "go straight at the next intersection", "the grade 2", and the "speed bump 2". However, since the number of map information that can be transmitted at a transmission time is four, the controller 130 may control the communication device 110 to transmit map information for location information, the "speed bump 1", the "go straight at the next intersection", and the "grade 2", which are four pieces of map information with higher priorities, at the time of 2000 ms, and to transmit map information for the "speed bump 2" that has been not transmitted at the time of 2000 ms, at a time of 3000 ms that is the next transmission time. The map information for the "speed bump 2" that has been not transmitted at the previous transmission time may be assigned a high priority next to location information, at the next transmission time.

Thereafter, if the diverge information changes to "turn right at the next intersection" during a time period from 2000 ms to 3000 ms, the controller 130 may assign a high priority to map information for the "speed bump 2" that has been not transmitted at the previous transmission time, next to location information, and assign higher priorities in the order of location information, the "speed bump 2", and the "turn right at the next intersection". Since the number of map information that is transmitted at a transmission time is four, the controller 130 may control the communication device 110 to transmit all map information for the "speed bump 2" and the "turn right at the next intersection" at the time of 3000 ms.

Thereafter, if the road condition information changes to "road condition 2", the section information changes to "grade 3", and the point information changes to "speed camera 1" and "speed camera 2" during a time period from 3000 ms to 4000 ms, the controller 130 may assign a higher priority to the "grade 3" having the closer distance than to the "road condition 2", the "speed camera 1", and the "speed camera 2", and assign a higher priority to the "speed camera 1" having the relatively closer distance than to the "speed camera 2". Also, the controller 130 may assign a higher priority to the "road condition 2" having a greater degree of importance between the "road condition 2" and the "speed camera 1" having the same distance, according to their degrees of importance. Accordingly, the controller 130 may assign higher priorities to location information, the "grade 3", the "road condition 2", the "speed camera 1", and the "speed camera 2" in this order. Since the number of map information that is transmitted at a transmission time is four, the controller 130 may control the communication device 110 to transmit map information for location information, the "grade 3", the "road condition 2", and the "speed camera 1" at the time of 4000 ms. Meanwhile, the speed camera 2 may be assigned a high priority next to location information, at a time of 5000 ms that is the next transmission time.

Thereafter, if the diverge information changes to "turn left at the next intersection" during a time period from 4000 ms to 5000 ms, the controller 130 may assign a higher priority to the "speed camera 2" that has been not transmitted at the previous transmission time, than to the "turn left at the next intersection". Accordingly, the controller 130 may assign higher priorities to location information, the "speed camera 2", and the "turn left at the next intersection" in this order so that map information for location information, the "speed camera 2", and the "turn left at the next intersection" is transmitted at the time of 5000 ms.

Thereafter, if the section information changes to "curvature 1" during a time period from 5000 ms to 6000 ms, the controller 130 may control the communication device 110 to transmit location information and map information for the "curvature 1" at the time of 6000 ms.

Referring again to FIG. 4, the display 140 is used to audiovisually output map information, an offset, etc. under the control of the controller 130. The display 140 may display map images included in map information, targets of map information, a current location of the vehicle, etc. for a user. The display 140 may be implemented using a Plasma Display Panel (PDP), Light Emitting Diodes (LEDs), or a Liquid Crystal Display (LCD). Also, the display 140 may be a 3Dimensional (3D) display that can display stereo images. The display 140 may include a touch screen. If the display 140 includes a touch screen, the display 140 may function as the input 150. The touch screen may be implemented with a resistive touch screen panel or a capacitive touch screen panel. Also, the touch screen may be implemented with a touch screen panel using ultrasonic waves or infrared light. Also, the display 140 may include a speaker in order to aurally output map information and an offset while visually displaying the map information and the offset for a user.

The input 150 may enable the user to input various control commands for controlling the map information transmission apparatus 100, and to input control commands while seeing the display 140 that includes a plurality of screens to display various images for map information. The user may set a spatial range within which a change of a target of map information is determined, may set a target of map information to change, may set an offset, and may input other setting information such as the number of map information that is transmitted at a transmission time, through the input 150.

Figure 12:
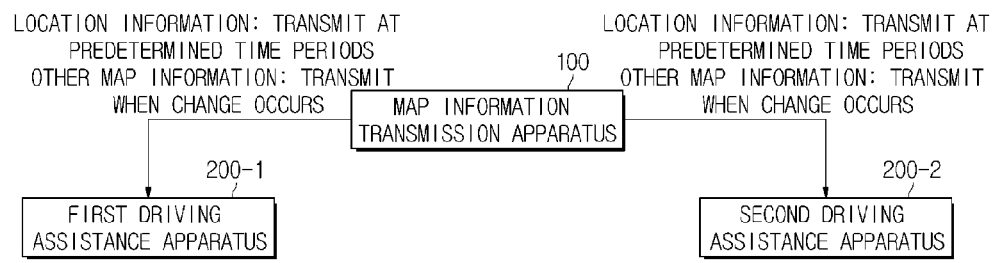
FIG. 12 is a view for describing a transmission method of a map information transmission apparatus for one or more driving assistance apparatuses.

FIG. 12 is a view for describing a transmission method of the map information transmission apparatus 100 for one or more driving assistance apparatuses. Referring to FIG. 12, the map information transmission apparatus 100 may transmit map information for first and second driving assistance apparatuses 200-1 and 200-2 to the respective driving assistance apparatus 200-1 and 200-2. The map information transmission apparatus 100 may transmit the map information for the individual driving assistance apparatuses 200-1 and 200-2 separately according to map information required by the individual driving assistance apparatuses 200-1 and 200-2. Also, the map information transmission apparatus 100 may transmit location information to the individual driving assistance apparatuses 200-1 and 200-2 at different time periods. Hereinafter, the driving assistance apparatus 200 that performs control operations based on map information received from the map information transmission apparatus 100 will be described. The driving assistance apparatus 200 may include the first driving assistance apparatus 200-1 and the second driving assistance apparatus 200-2 of FIG. 12.

Figure 13:
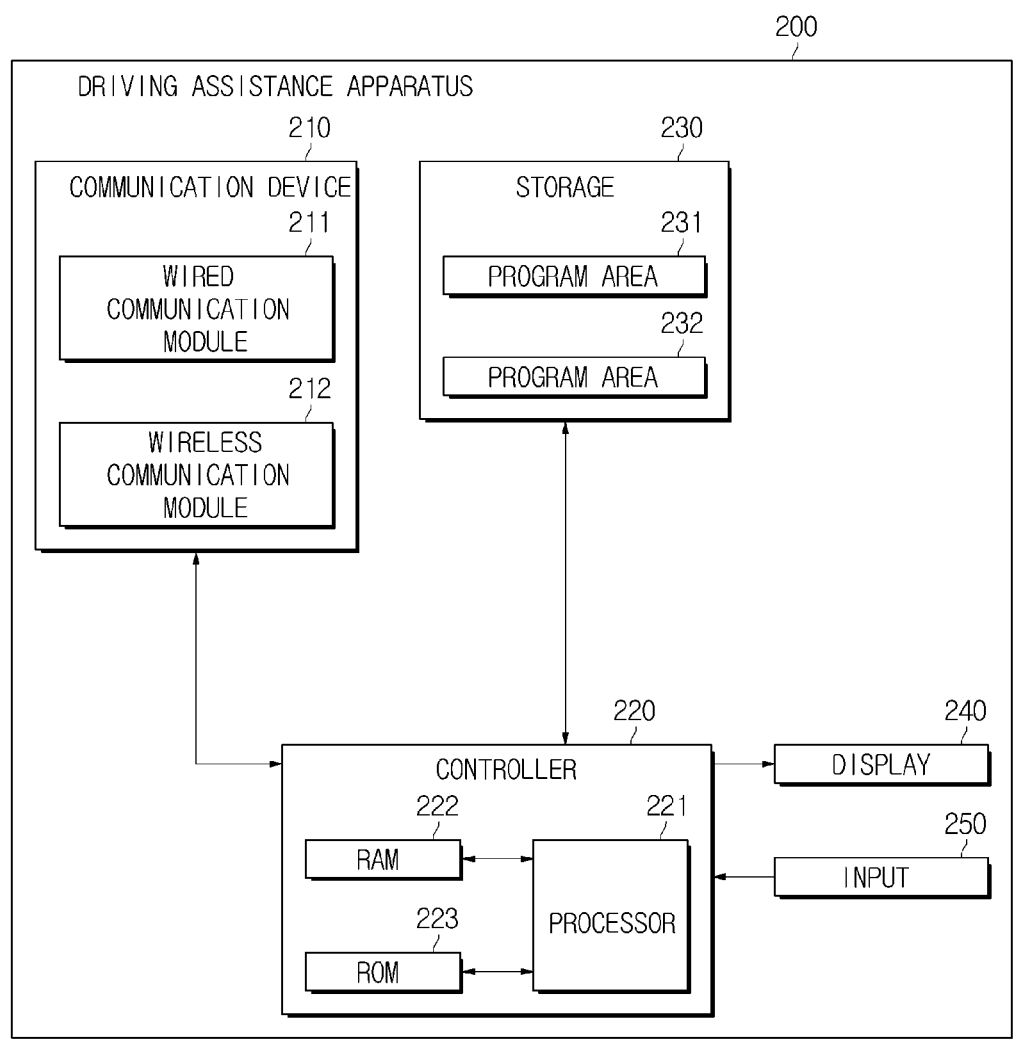
FIG. 13 is a block diagram of a driving assistance apparatus according to an embodiment of the present disclosure.

FIG. 13 is a block diagram of the driving assistance apparatus 200 according to an embodiment of the present disclosure.

Referring to FIG. 13, the driving assistance apparatus 200 may include a communication device 210 to connect to a network, a controller 220 to control functions of components of the driving assistance apparatus 200, a storage 230 to store programs for control operations, user data, etc., a display 240 to audiovisually provide map information for a user, and an input 250 to receive commands from a user.

The communication device 210 may receive map information transmitted from the map information transmission apparatus 100 through a wired/wireless network. Herein, the network may be a wired network (e.g., LAN, WAN, VAN, or CAN) or a wireless network (e.g., a mobile radio communication network or a satellite communication network). The communication device 210 may include a wired communication module 211 to connect to a wired network, and a wireless communication module 212 to connect to a wireless network. Also, the driving assistance apparatus 200 may receive an offset together with map information through the network.

According to an embodiment, the communication device 210 may collect map information from the map information transmission apparatus 100 through a CAN. The map information may include location information, setting information, road condition information, path attribute information, diverge information, and other information. The collected map information may be stored in the storage 230 which will be described later. However, the communication device 210 may collect map information through any other wired/wireless network than the CAN.

Also, the communication device 210 may receive location information of the vehicle from the map information transmission apparatus 100, at predetermined time periods, under the control of the controller 220. More specifically, if a transmission time period is set to, for example, 1000 ms, the communication device 210 may receive location information from the map information transmission apparatus 100 in units of 1000 ms, that is, at 1000 ms, 2000 ms, 3000 ms, . . . .

Meanwhile, the communication device 210 may receive setting information, road condition information, path attribute information, diverge information, and other information, which are map information except for location information that is transmitted at predetermined time periods, only when a target of map information changes, through the CAN. More specifically, if a target of map information required by the driving assistance apparatus 200 changes according to lapse of driving time, a change of driving space, or a user's selection, the communication device 210 may receive map information from the map information transmission apparatus 100 through the network, according to a control signal from the controller 220. Cases in which a target of map information changes may include a case in which a target of map information changes or is added within a spatial range set by the vehicle, the map information transmission apparatus 100, or the driving assistance apparatus 200 according to driving of the vehicle, and a case in which a target of map information changes or is added according to a request from the driving assistance apparatus 200, and a case in which a target of map information changes or is added according to a user's input.

According to an embodiment, if a speed camera 1 is newly found within a spatial range (for example, within 1000 m ahead) set by the vehicle, the map information transmission apparatus 100, or the driving assistance apparatus 200, the communication device 210 may receive map information related to the speed camera 1 from the map information transmission apparatus 100. Meanwhile, the spatial range may include an estimated time of arrival as well as a distance. If the spatial range is set to an estimated time of arrival of 10 seconds, and it is determined that a speed camera 1 is found within a spatial range corresponding to the estimated time of arrival of 10 seconds, the communication device 210 may receive map information related to the speed camera 1 from the map information transmission apparatus 100. In this case, the communication device 210 may receive information related to the spatial range, together with the map information, from the map information transmission apparatus 100, wherein the spatial range may function as an offset. Also, it is possible to set different spatial ranges for individual targets of map information.

According to another embodiment, if a target of map information changes from a speed camera 1 to a speed camera 2 according to a request from the driving assistance apparatus 200, the communication device 210 may receive map information related to the speed camera 2 from the map information transmission apparatus 100.

According to another embodiment, if a speed camera 1 is input as a target of map information by a user, that is, if a target of map information is added according to a user's input, the communication device 110 may receive map information related to the speed camera 1 from the map information transmission apparatus 100. The user may change or add a target of map information by inputting the target of map information through the input 150 which will be described later.

That is, when a target of map information changes or a new target of map information is added, the communication device 210 may receive map information related to the target one time, instead of receiving map information related to the target at predetermined time periods, like location information, thereby preventing overlapping reception of map information.

Also, since the communication device 210 may receive map information only when a target of map information changes, it is possible to prevent overload upon transmission of map information.

Meanwhile, the communication device 210 may receive information about a distance to the target of map information or information about an estimated time of arrival at the target of map information, together with the map information, from the map information transmission apparatus 100. The distance to the target of map information or the estimated time of arrival at the target of map information is referred to as an offset. A detailed description for the offset has been given in the above-description related to the map information transmission apparatus 100.

Referring again to FIG. 13, the controller 220 may control overall operations of the driving assistance apparatus 200. More specifically, the controller 220 may include a processor 221, ROM 223 to store control programs for controlling the driving assistance apparatus 200, and RAM 222 to store signals or data received from external devices, and used as a storage area for various tasks that are performed by the driving assistance apparatus 200.

In addition, there may be provided a graphic processing board (not shown) including the processor 221, the RAM 222, or the ROM 223 on a separate circuit substrate electrically connected to the controller 220. The processor 221, the RAM 222, and the ROM 223 may be connected to each other through internal buses. Also, the controller 220 can be used as a term indicating any component including the processor 221, the ROM 223, and the RAM 222. Also, the controller 220 can be used as a term indicating any component including the processor 221, the ROM 223, the RAM 222, and the graphic processing board.

According to an embodiment, the controller 220 may calculate a distance between the vehicle and a changed target of map information, or an estimated time of arrival at the changed target of map information, based on an offset and location information received from the map information transmission apparatus 100. Herein, the distance between the vehicle and the changed target of map information may include a distance between the driving assistance apparatus 200 and the changed target of map information, or a distance between the map information transmission apparatus 100 and the changed target of map information. More specifically, if the driving assistance apparatus 200 receives an offset, the controller 220 may calculate a distance between the vehicle and a changed target of map information at the next transmission time (a first time), or an estimated time of arrival at the changed target of map information at the first time, based on location information received at the next transmission time, and may calculate a distance between the vehicle and the changed target of map information at a transmission time (a second time) after next, or an estimated time of arrival at the changed target of map information at the second time, based on location information received at the transmission time after next. The calculated distances at the individual transmission times or the calculated, estimated times of arrival at the individual transmission times may be audiovisually output by the display 240, transmitted to the map information transmission apparatus 100, or used as information for other driving assistance control operations of the driving assistance apparatus 200.

Figure 14:
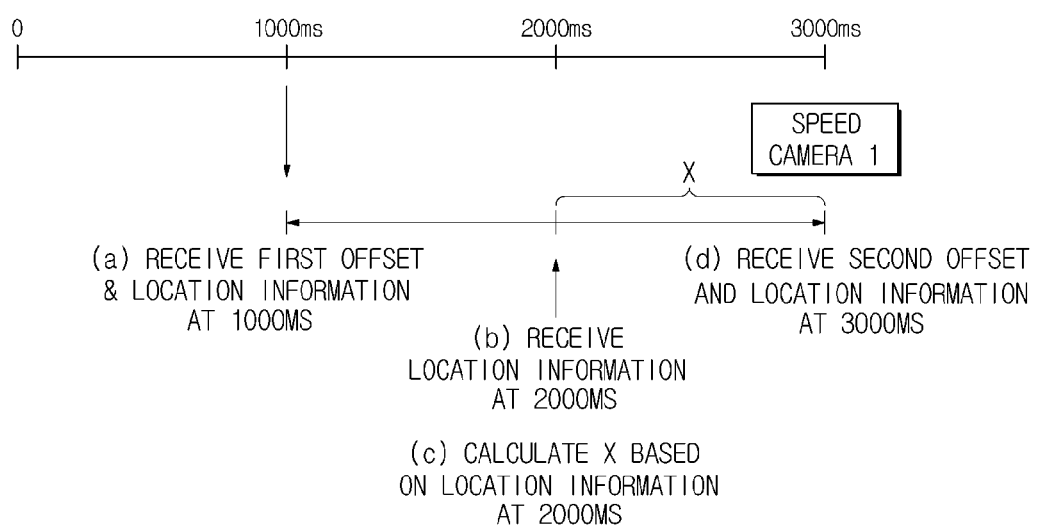
FIG. 14 is a view for describing a method in which a controller according to an embodiment of the present disclosure calculates a distance and an estimated time of arrival.

FIG. 14 is a view for describing a method in which the controller 220 according to an embodiment of the present disclosure calculates a distance and an estimated time of arrival.

Referring to FIG. 14, if the driving assistance apparatus 200 receives a first offset for a speed camera 1 and location information y1 at a time of 1000 ms, the controller 220 may calculate a distance between the vehicle and the target or an estimated time of arrival at the target at the time of 1000 ms, the distance being equal to the first offset. Thereafter, if the driving assistance apparatus 200 receives location information y2 at a time of 2000 ms, the controller 220 may calculate a distance X between the vehicle and the target at the time of 2000 ms or an estimated time of arrival at the target at the time of 2000 ms, by deducting a predetermined value from the first offset. Herein, the predetermined value may be calculated based on the location information received at the time of 2000 ms and the location information received at the time of 1000 ms. For example, if a mileage of the vehicle at the time of 2000 ms is 1000 m and a mileage of the vehicle at the time of 1000 ms is 970 m, the predetermined value may be calculated as 30 m. For example, if the first offset is 200 m, the distance between the vehicle and the target at the time of 2000 ms may be calculated as 170 m (200−30=170). A distance between the vehicle and a target or an estimated time of arrival at the target may be calculated for each changed target of map information. The calculated distance or the calculated, estimated time of arrival may be audiovisually output by the display 240, transmitted to the map information transmission apparatus 200, or used to control other functions of the driving assistance apparatus 200. For example, the calculated distance or the calculated, estimated time of arrival may be used as a sensing variable that is used by the driving assistance apparatus 200 to control the speed of the vehicle.

Referring again to FIG. 13, the storage 230 may include a program area 231 and a data area 232 to store programs and data related to the driving assistance apparatus 200, wherein the program area 231 may store programs for performing functions of the driving assistance apparatus 200, and the data area 232 may store data, such as map information and offset information received from the map information transmission apparatus 100, and a distance or an estimated time of arrival calculated by the controller 220, which is generated according to use of the driving assistance apparatus 200. The stored data may be displayed for the user through the display 240.

Meanwhile, in FIG. 13, a case in which the controller 220 includes ROM 223 to store control programs for controlling the driving assistance apparatus 200, and RAM 222 to store signals or data received from external devices, and used as a storage area for various tasks that are performed by the driving assistance apparatus 200 is shown. However, the ROM 223 and the RAM 222 may be included in the storage 230, instead of the controller 220. Also, the storage 230 may be implemented as a mobile device that can be inserted into the driving assistance apparatus 200, instead of being fixedly installed in the driving assistance apparatus 200.

Also, the storage 230 may be implemented as an independent device separated from the controller 220, as shown in FIG. 13. However, the storage 230 may be included in the controller 220. In this case, the storage 230 may be connected to components constituting the controller 220 on a board or in an apparatus.

The display 240 is used to audiovisually provide map information, an offset, a distance, an estimated time of arrival, etc. under the control of the controller 220, and may display map images included in received map information, targets of map information, a current location of the vehicle, etc. for a user. The display 240 may be implemented using a PDP, LEDs, or a LCD. Also, the display 240 may be a 3D display that can display stereo images. The display 240 may include a touch screen. If the display 240 includes a touch screen, the display 240 may function as the input 250. The touch screen may be implemented with a resistive touch screen panel or a capacitive touch screen panel. Also, the touch screen may be implemented with a touch screen panel using ultrasonic waves or infrared light. Also, the display 240 may include a speaker in order to aurally output map information and an offset while visually displaying the map information and the offset for a user.

The input 250 may enable the user to input various control commands for controlling the driving assistance apparatus 200, and to input control commands while seeing the display 240 that includes a plurality of screens to display various images for map information.

Figure 15:
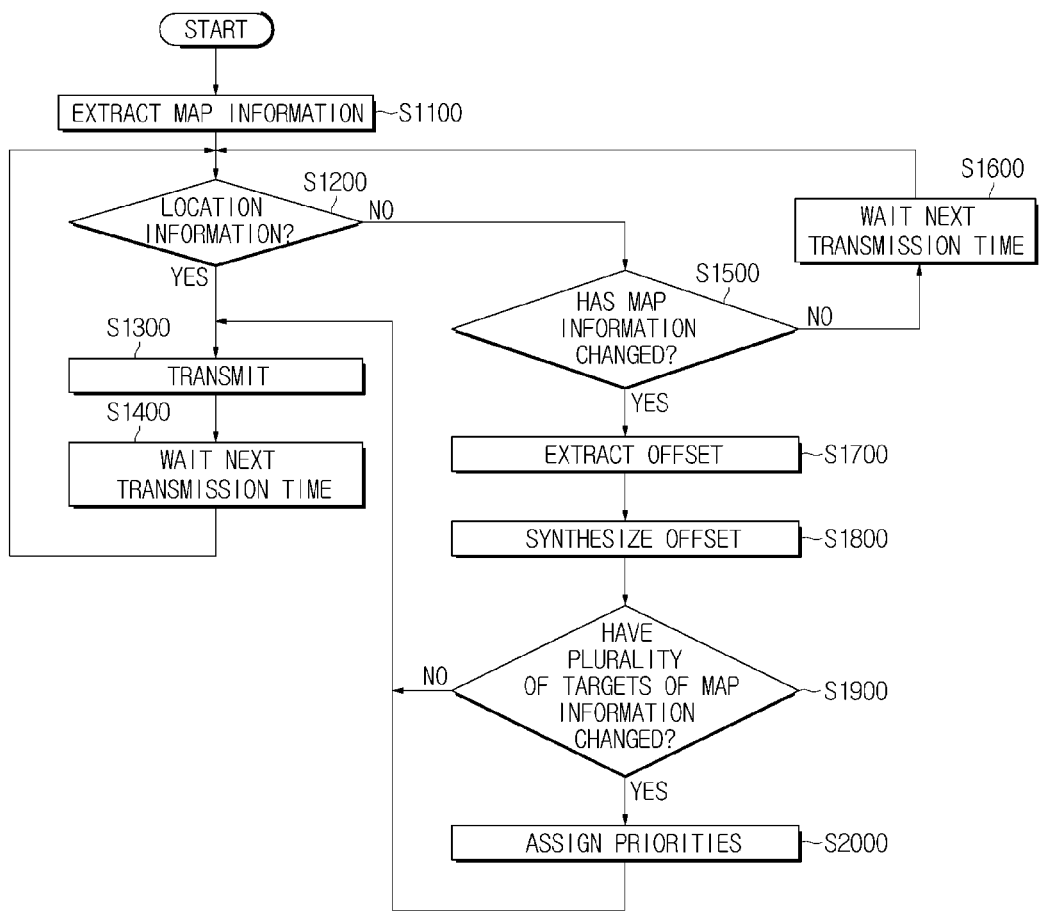
FIG. 15 is a flowchart illustrating a method of controlling a map information transmission apparatus, according to an embodiment of the present disclosure.
Figure 16:
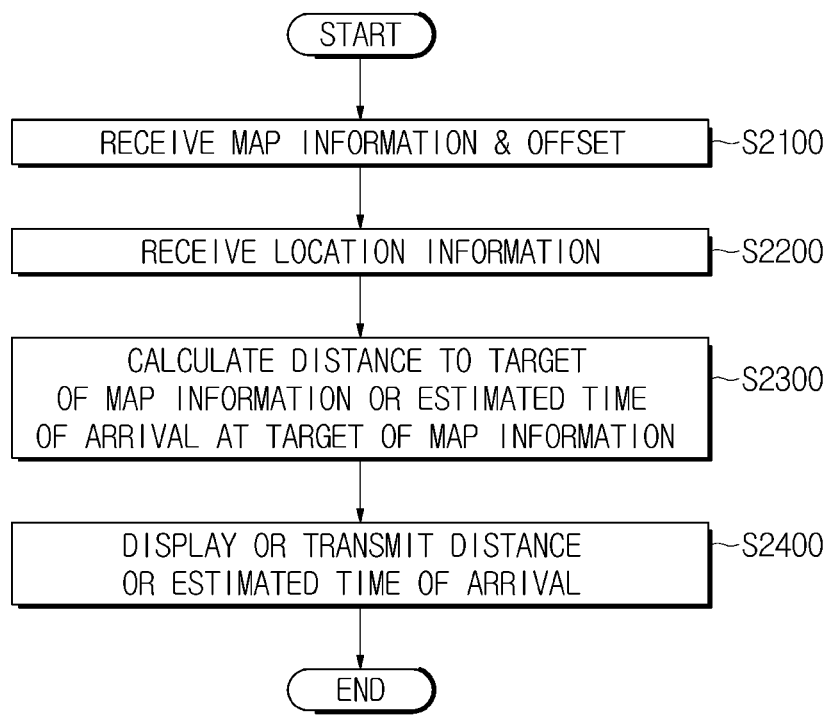
FIG. 16 is a flowchart illustrating a method of controlling a driving assistance apparatus, according to an embodiment of the present disclosure.

FIG. 15 is a flowchart illustrating a method of controlling the map information transmission apparatus 100, according to an embodiment of the present disclosure, and FIG. 16 is a flowchart illustrating a method of controlling the driving assistance apparatus 200, according to an embodiment of the present disclosure.

Referring to FIG. 15, the map information transmission apparatus 100 may extract stored map information according to map information required by the driving assistance apparatus 200, in operation S1100. If the map information is location information ("Yes" in operation S1200), the map information transmission apparatus 100 may transmit the location information to the driving assistance apparatus 200, in operation S1300, and then wait the next transmission time, in operation S1400, in order to transmit location information at predetermined time periods. Meanwhile, if the map information is not location information ("No" in operation S1200), the map information transmission apparatus 100 may determine whether the map information has changed, in operation S1500. If the map information transmission apparatus 100 determines that the map information has not changed ("No" in operation S1500), the map information transmission apparatus 100 may wait the next transmission time, in operation S1600. Meanwhile, if the map information transmission apparatus 100 determines that the map information has changed ("Yes" in operation S1500), the map information transmission apparatus 100 may extract an offset for a target of the corresponding map information, in operation S1700. The offset may have been stored in advance in the map information transmission apparatus 100, or may be calculated by the map information transmission apparatus 100. Successively, the map information transmission apparatus 100 may synchronize the extracted offset for accurate estimation, in operation S1800, and determine whether a plurality of targets of the map information have changed at the corresponding time, in operation S1900. If the map information transmission apparatus 100 determines that a target of the map information has changed at the corresponding time ("No" in operation S1900), the map information transmission apparatus 100 may transmit the map information at the corresponding time together with location information, and wait the next transmission time, in operations S1300 and S1400. However, if the map information transmission apparatus 100 determines that a plurality of targets of the map information have changed at the corresponding time ("Yes" in operation S1900), the map information transmission apparatus 100 may assign predetermined priorities to the individual targets of the map information, and then transmit the map information according to the priorities, in operation S2000.

Meanwhile, referring to FIG. 16, the driving assistance apparatus 200 may receive map information and an offset, in operation S2100, and also receive location information, in operation S2200. In FIG. 16, a case in which the driving assistance apparatus 200 receives map information and an offset and then receives location information is shown. However, the driving assistance apparatus 200 may receive location information before receiving map information and an offset, or may receive map information, an offset, and location information at the same time. That is, the execution order of operations S2100 and S2200 is not limited. Successively, the driving assistance apparatus 200 may calculate a distance between a target of the received map information and the vehicle, or an estimated time of arrival at the target of the received map information, in operation S2300. The distance or the estimated time of arrival may be calculated based on the received offset and location information received at each transmission time, and the calculated distance or the calculated, estimated time of arrival may be audiovisually output by the driving assistance apparatus 200, transmitted to the map information transmission apparatus 100, or used as a variable to perform other functions of the driving assistance apparatus 200, in operation S2400.

Meanwhile, in the above description, the map information transmission apparatus 100 is distinguished from the driving assistance apparatus 200, however, the map information transmission apparatus 100 and the driving assistance apparatus 200 can be termed as driving assistance apparatuses 100 and 200.

By using the map information transmission apparatus 100, the driving assistance apparatus 200, and the control methods thereof according to the embodiments of the present disclosure as described above, it is possible to acquire information required for control operations of the driving assistance apparatus 200 without overlapping transmission of map information.

Also, by using the map information transmission apparatus 100, the driving assistance apparatus 200, and the control methods thereof according to the embodiments of the present disclosure as described above, it is possible to estimate a target of map information using received location information, and to prevent overload upon transmission of map information since no additional transmission of map information is required.

According to the embodiments of the present disclosure as described above, by transmitting map information when a target of map information changes, it is possible to limit unnecessary transmission of map information.

Also, according to the embodiments of the present disclosure as described above, by transmitting map information when a target of map information changes, it is possible to prevent overlapping transmission of map information.

Also, according to the embodiments of the present disclosure as described above, it is possible to estimate a target of map information using location information, and to prevent or reduce overload upon transmission of map information since no additional transmission of map information is required.

Meanwhile, some of the components which constitute the driving assistance apparatus 100 or 200 according to the embodiments of the present disclosure as described above may be implemented by modules. The term "module" means a software or hardware component such as a Field Programmable Gate Array (FPGA) or an Application Specific Integrated Circuit (ASIC) and the modules each perform assigned functions. However, the modules are not limited to software or hardware. The modules may be configured in an addressable storage medium, or may be configured to run on at least one processor.

Therefore, as an example, the modules include: components such as software components, object-oriented software components, class components, and task components; processors, functions, attributes, procedures, sub-routines, segments of program codes, drivers, firmware, microcodes, circuits, data, databases, data structures, tables, arrays, and variables. The functions provided by the components and the modules may be combined into fewer components and/or modules may be separated into additional components and modules. In addition, the components and modules may execute one or more Central Processing Units (CPUs) in a device.

The driving assistance apparatus 100 or 200 and the control method thereof as described above may be implemented as computer-readable code in a computer-readable recording medium. The computer-readable recording medium may include any kind of recording device storing computer-readable data. Examples of the recording medium may include Read Only Memory (ROM), Random Access Memory (RAM), magnetic tape, magnetic disk, flash memory, optical data storage, and the like. In addition, the computer-readable recording medium may be distributed over the computer systems connected over a computer communication network, and computer-readable codes may be stored and executed in a distributed manner.

The aforementioned descriptions are only for illustrative purposes, and it will be apparent that those skilled in the art can make various modifications thereto without changing the technical spirit and essential features of the present disclosure. Thus, it should be understood that the exemplary embodiments described above are merely for illustrative purposes and not for limitation purposes in all aspects. For example, each component described as a single type can be implemented in a distributed type, and components described as distributed can be implemented in a combined form.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A driving assistance apparatus for a vehicle, comprising:
    a storage, mounted inside the vehicle, configured to store map information;
    a communication device, mounted inside the vehicle, configured to transmit location information to a second driving assistance apparatus of the vehicle at predetermined time periods; and
    a controller, mounted inside the vehicle and communicatively connected to the storage and the communication device, configured to cause the communication device to transmit the map information to the second driving assistance apparatus if a target of the map information changes.

2. The driving assistance apparatus of claim 1, wherein if the target is found within a predetermined spatial range, the communication device transmits map information for the target to the second driving assistance apparatus.

3. The driving assistance apparatus of claim 2, wherein if the target is found within the predetermined spatial range, the communication device transmits the map information for the target and information about the predetermined spatial range to the second driving assistance apparatus.

4. The driving assistance apparatus of claim 2, wherein the storage stores a plurality of pieces of map information, and the predetermined spatial range is set for a target of each piece of the map information.

5. The driving assistance apparatus of claim 1, wherein if the target of the map information changes, the communication device transmits at least one of information about a distance to the changed target and information about an estimated time of arrival at the changed target to the second driving assistance apparatus.

6. The driving assistance apparatus of claim 5, wherein the controller is further configured to calculate at least one of the distance to the changed target and the estimated time of arrival at the changed target.

7. The driving assistance apparatus of claim 1, wherein if the target of the map information changes, the communication device transmits the map information to the second driving assistance apparatus at a next transmission time of the location information.

8. The driving assistance apparatus of claim 7, wherein the controller is further configured to calculate at least one of a distance between the changed target and the driving assistance apparatus and an estimated time of arrival at the changed target,
    wherein the controller calculates at least one of the distance between the changed target and the driving assistance apparatus at the next transmission time of the location information and the estimated time of arrival at the changed target at the next transmission time of the location information, and
    the communication device transmits the at least one of the distance between the changed target and the driving assistance apparatus at the next transmission time of the location information and the estimated time of arrival at the changed target at the next transmission time of the location information, together with the map information, to the second driving assistance apparatus.

9. The driving assistance apparatus of claim 1, wherein the map information includes at least one information among setting information of the second driving assistance apparatus, road condition information, path attribute information, and diverge information.

10. The driving assistance apparatus of claim 1, wherein the controller is further configured to assign a priority to the map information,
    wherein the storage stores a plurality of pieces of map information to which priorities have been assigned, and
    the communication device transmits the map information according to the priority.

11. The driving assistance apparatus of claim 10, wherein the controller assigns the priority to the map information according to a distance between the target of the map information and the driving assistance apparatus.

12. The driving assistance apparatus of claim 10, wherein the controller assigns the priority to the map information according to a predetermined degree of importance of the map information.

13. The driving assistance apparatus of claim 1, wherein the driving assistance apparatus includes an Audio Video Navigation (AVN) apparatus.

14. The driving assistance apparatus of claim 1, wherein the communication device transmits the map information to the second driving assistance apparatus one time if the target of the map information changes.

15. A driving assistance apparatus for a vehicle, comprising:
    a communication device, mounted inside the vehicle, configured to receive map information and location information; and
    a controller configured to:
        calculate at least one of a distance between a target of the map information and the driving assistance apparatus and an estimated time of arrival at the target of the map information, based on location information received at predetermined time periods; and
        control the communication device to transmit, to another driving assistance apparatus of the vehicle, the at least one of the distance between the target of the map information and the driving assistance apparatus and the estimated time of arrival at the target of the map information.

16. The driving assistance apparatus of claim 15, further comprising a display configured to display at least one of the distance between the target of the map information and the driving assistance apparatus and the estimated time of arrival, calculated by the controller, for a user.

17. The driving assistance apparatus of claim 15, wherein the communication device transmits at least one of the distance between the target of the map information and the driving assistance apparatus and the estimated time of arrival at the target of the map information, calculated by the controller, to another driving assistance apparatus.

18. The driving assistance apparatus of claim 15, wherein the communication device receives a plurality of pieces of map information and a plurality of offsets corresponding to the respective pieces of map information, and the controller calculates at least one of a distance between a target of each piece of the map information and the driving assistance apparatus and an estimated time of arrival at the target of the piece of the map information, based on the location information received at the predetermined time periods and the offsets.

19. The driving assistance apparatus of claim 15, further comprising a storage configured to store the distance between the target of the map information and the driving assistance apparatus and the estimated time of arrival at the target of the map information.

20. A control method of a driving assistance apparatus for a vehicle, comprising:

transmitting, from the driving assistance apparatus mounted inside the vehicle, location information to a second driving assistance apparatus of the vehicle at predetermined time periods;

extracting, by the driving assistance apparatus, map information; and transmitting the map information from the driving assistance apparatus to the second driving assistance apparatus if a target of the map information changes.

21. The control method of claim 20, further comprising, before the transmitting of the location information, receiving location information of the driving assistance apparatus.

* * * * *